United States Patent
Symons et al.

(10) Patent No.: US 12,511,947 B1
(45) Date of Patent: Dec. 30, 2025

(54) IMAGE DATA DOWNLOAD USING A GATEWAY DEVICE

(71) Applicant: Samsara Inc., San Francisco, CA (US)

(72) Inventors: Jason Symons, Dublin, CA (US); Vignesh Bhuvaneshwar Iyer, Los Altos, CA (US); Gregory Wood, Acworth, GA (US); Ivan Stoev, Santa Barbara, CA (US); William Jennings, Brookhaven, GA (US); Yuri Melnikov, Conshohocken, PA (US); Karthikram Rajadurai, San Leandro, CA (US); Meelap Shah, Portland, OR (US); Arthur Huang, San Francisco, CA (US); Joyce Chen, San Francisco, CA (US); Karthikeyan Kailasam, Aurora, IL (US); Samuel Goldman, Silver Spring, MD (US); Scott McConnell, Berwyn, PA (US); Gyulnara Grigoryan, San Francisco, CA (US); Kushagra Gupta, San Francisco, CA (US); Max Chen, Long Island City, NY (US); Rhea Lin, San Francisco, CA (US); Seamus Feider-Sullivan, San Francisco, CA (US); Rajiv Malik, San Jose, CA (US); Caglar Iskender, Redmond, WA (US)

(73) Assignee: Samsara Inc., San Francisco, CA (US)

( * ) Notice: Subject to any disclaimer, the term of this patent is extended or adjusted under 35 U.S.C. 154(b) by 381 days.

(21) Appl. No.: 18/151,669

(22) Filed: Jan. 9, 2023

Related U.S. Application Data

(60) Provisional application No. 63/376,241, filed on Sep. 19, 2022.

(51) Int. Cl.
*G07C 5/00* (2006.01)
*G07C 5/12* (2006.01)

(52) U.S. Cl.
CPC ............ *G07C 5/008* (2013.01); *G07C 5/12* (2013.01)

(58) Field of Classification Search
CPC ................. G07C 5/008; G07C 5/12
See application file for complete search history.

(56) References Cited

U.S. PATENT DOCUMENTS

| 4,671,111 | A | 6/1987 | Lemelson |
| 5,825,283 | A | 10/1998 | Camhi |

(Continued)

FOREIGN PATENT DOCUMENTS

| CN | 111047179 A | 4/2020 |
| DE | 10 2004 015 221 A1 | 10/2005 |

(Continued)

OTHER PUBLICATIONS

US 11,450,210 B2, 09/2022, Tsai et al. (withdrawn)

(Continued)

*Primary Examiner* — Donald J Wallace
*Assistant Examiner* — Jalal C Coduroglu
(74) *Attorney, Agent, or Firm* — Knobbe Martens Olson & Bear LLP

(57) ABSTRACT

A management server system may obtain a request for image data from a computing device. The request may identify a subset of image data to be downloaded and/or streamed to the computing device. The management server system can provide an indication of a storage destination for the image data to a gateway device and initiate upload of the image data from the gateway device to the storage destination. The management server system may monitor the upload and, based on the monitoring, determine the upload is complete.

(Continued)

The management server system can cause display of a user interface that includes a visualization of the image data for download of the image data from the storage destination to the computing device.

20 Claims, 16 Drawing Sheets

(56) References Cited

U.S. PATENT DOCUMENTS

| | | | |
|---|---|---|---|
| 5,917,433 A | 6/1999 | Keillor et al. |
| 6,064,299 A | 5/2000 | Lesesky et al. |
| 6,098,048 A | 8/2000 | Dashefsky et al. |
| 6,157,864 A | 12/2000 | Schwenke et al. |
| 6,253,129 B1 | 6/2001 | Jenkins et al. |
| 6,317,668 B1 | 11/2001 | Thibault et al. |
| 6,411,203 B1 | 6/2002 | Lesesky et al. |
| 6,421,590 B2 | 7/2002 | Thibault |
| 6,452,487 B1 | 9/2002 | Krupinski |
| 6,505,106 B1 | 1/2003 | Lawrence et al. |
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,127,810 B2 | 11/2018 | Durie, Jr. et al. |
| 10,157,321 B2 | 12/2018 | Becker et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,261,652 B1 * | 4/2019 | Patel ................. G06T 11/206 |
| 10,275,959 B2 | 4/2019 | Ricci |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |

(56) References Cited

U.S. PATENT DOCUMENTS

| | | | |
|---|---|---|---|
| 10,652,335 B2 | 5/2020 | Botticelli |
| 10,715,976 B2 | 7/2020 | Hoffner et al. |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,131,986 B1 | 9/2021 | Gal et al. |
| 11,132,853 B1* | 9/2021 | Akhtar .................. G08G 1/202 |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1* | 6/2022 | Akhtar ............... G01C 21/3804 |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1* | 8/2023 | Dubin .................. G08G 1/13 340/990 |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B1 | 10/2023 | Dugar et al. |
| 11,838,884 B1* | 12/2023 | Dergosits ............. G06F 1/3234 |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B2 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 12,140,445 B1 | 11/2024 | Akhtar et al. |
| 12,150,186 B1 | 11/2024 | Aguilar et al. |
| 12,165,360 B1 | 12/2024 | Jain et al. |
| 12,168,445 B1 | 12/2024 | Srinivasan et al. |
| 12,172,653 B1 | 12/2024 | Akhtar et al. |
| 12,179,629 B1 | 12/2024 | Govan et al. |
| 12,197,610 B2 | 1/2025 | Wen et al. |
| 12,213,090 B1 | 1/2025 | Dergosits et al. |
| 12,228,944 B1 | 2/2025 | Dubin et al. |
| 12,253,617 B1 | 3/2025 | Aguilar et al. |
| 12,256,021 B1 | 3/2025 | Torres et al. |
| 12,260,616 B1 | 3/2025 | Rajan et al. |
| 12,269,498 B1 | 4/2025 | Rommel et al. |
| 12,289,181 B1 | 4/2025 | Stevenson et al. |
| 12,306,010 B1 | 5/2025 | Rommel et al. |
| 12,327,445 B1 | 6/2025 | Eberhardt et al. |
| 12,328,639 B1 | 6/2025 | Smith et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | McClellan et al. |
| 2008/0266107 A1* | 10/2008 | Rodgers ............... A61B 5/0031 340/572.8 |
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |

(56) References Cited

U.S. PATENT DOCUMENTS

| | | |
|---|---|---|
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0180556 A1* | 6/2014 | Warkentin ......... G06Q 10/0639 701/99 |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2016/0046298 A1 | 2/2016 | DeRuyck et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0327613 A1 | 10/2019 | Bicket et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0380806 A1 | 12/2020 | Tabata |
| 2020/0389415 A1 | 12/2020 | Zhao et al. |
| 2021/0006950 A1 | 1/2021 | Hajimiri et al. |
| 2021/0097315 A1 | 4/2021 | Carruthers et al. |
| 2021/0192867 A1* | 6/2021 | Fang .................. G07C 5/0816 |
| 2021/0397908 A1 | 12/2021 | ElHattab et al. |
| 2022/0108260 A1* | 4/2022 | DaCosta ............... G06F 3/0482 |
| 2022/0165073 A1 | 5/2022 | Shikii et al. |
| 2022/0289203 A1 | 9/2022 | Makilya et al. |
| 2022/0374737 A1 | 11/2022 | Dhara et al. |
| 2023/0077207 A1 | 3/2023 | Hassan et al. |
| 2023/0153735 A1 | 5/2023 | Dhara et al. |
| 2023/0169420 A1 | 6/2023 | Dhara et al. |
| 2023/0214090 A1* | 7/2023 | Wohlstadter .......... G06F 3/0482 715/811 |
| 2023/0219592 A1 | 7/2023 | Calmer et al. |
| 2023/0281553 A1 | 9/2023 | Singh et al. |
| 2023/0282036 A1* | 9/2023 | Simoudis ................. G06N 3/08 |
| 2023/0298410 A1 | 9/2023 | Calmer et al. |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |

(56) References Cited

U.S. PATENT DOCUMENTS

| | | | |
|---|---|---|---|
| 2024/0146629 | A1 | 5/2024 | Lloyd |
| 2024/0160518 | A1* | 5/2024 | Shebey, III ......... G06F 11/0721 |
| 2025/0002033 | A1 | 1/2025 | Calmer et al. |

FOREIGN PATENT DOCUMENTS

| | | |
|---|---|---|
| EP | 1615178 A2 | 1/2006 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

Malamas, Elias N. et al. "A survey on industrial vision systems, applications and tools", Sep. 17, 2002, Image and Vision Computing 21, pp. 171-188.

U.S. Appl. No. 18/073,857, Image Data Download Using a Gateway Device, filed Dec. 2, 2022.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Take control of your fleet with Groups and Features Access.", Motive Technologies, Inc., Apr. 4, 2017, in 3 pages. URL: https://gomotive.com/blog/take-control-fleet-groups-features-access/.

Motive, "The most accurate AI just got better.", Motive Technologies, Inc., Mar. 8, 2023, in 8 pages. URL: https://gomotive.com/blog/fewer-fleet-accidents-with-the-new-ai/.

Motive, "U.S. speed limits. What drivers and fleets need to know.", Motive Technologies, Inc., Jan. 13, 2022, in 8 pages. URL: https://gomotive.com/blog/us-speed-limits-for-drivers/.

(56) References Cited

OTHER PUBLICATIONS

Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
"Driver Speed Management for Fleets—Monitoring Speeding in your fleet to increase safety and lower costs", Lytx, 2018, in 9 pages. URL: https://web.archive.org/web/20181217230050/https://www.lytx.com/en-us/fleet-services/program-enhancements/speed-management-for-fleets.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco: Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Making roads safer for everyone, everywhere", Light Metrics, 2023, in 8 pages. URL: https://www.lightmetrics.co/about-us.
"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
Batchelor, B. et al., "Vision Systems on the Internet", Proc. SPIE 6000, Two- and Three-Dimensional Methods for Inspection and Metrology III, Nov. 2005, vol. 600003, in 15 pages.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman ® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf [uploaded in 2 parts].
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.
Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.
Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.
Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.

(56) References Cited

OTHER PUBLICATIONS

Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Groover, M. P., *Automation, Production Systems, and Computer-Integrated Manufacturing*, 2016, 4th Edition (Indian Subcontinent Adaptation), Pearson, in 11 pages.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Horsey, J., "Vezo 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS One, Apr. 2017, vol. 12(4): e0174959, in 16 pages.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lotan, T. et al., "In-Vehicle Data Recorder for Evaluation of Driving Behavior and Safety", Transportation Research Record Journal of the Transportation Research Board, Jan. 2006, in 15 pages.
Lytx, "TeenSafe Driver Program", American Family Insurance®, 2014, in 10 pages. URL: https://online-sd02.drivecam.com/Downloads/TSD_WebsiteGuide.pdf.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne presentation, Netradyne, Oct. 2016, in 23 pages.
Netradyne, Driver Card 1, 2018, in 2 pages.
Netradyne, Driver Card 2, 2018, in 2 pages.
Ohidan, A., "Fiat And AKQA Launch Eco:Drive™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B—Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages. [uploaded in 3 parts].
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.

(56) References Cited

OTHER PUBLICATIONS

"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group—Improved driver behavior contributes to a 3+% MPG improvement in less than 12 months", FuelOpps by Propel IT, [publication date unknown], in 2 pages.
"FuelOpps ™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page. (PROPEL-IT-1393_00019).
Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.
Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).
"Cargo Monitor", Samsara Inc., accessed Feb. 21, 2024 [publication date unknown], in 2 pages. URL: https://www.samsara.com/products/models/cargo-monitor.
"Connect your operations on the Samsara Platform.", Samsara Inc., [publication date unknown]. URL: https://www.samsara.com/products/platform/?gad_source=1&gclid=EAIaIQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
Driver I, The Power of Vision, Netradyne, [publication date unknown], in 2 pages.
"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.
"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"EcoDrive", Wikipedia, 2022, in 1 page. URL: https://en.wikipedia.org/wiki/EcoDrive.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Guide: Drive risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 22 pages.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.
"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.
"NetraDyne, an Artificial Intelligence Leader, Launches Driver-i™, a Vision-Based Platform, Focusing on Commercial Vehicle Driver Safety", Netradyne, [publication date unknown], in 2 pages.
"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.
"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https:/keeptruckin.com/dashcam.
"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Spec Sheet: AI Dashcam", Motive Technologies, Inc., [publication date unknown], Document No. 2023Q2_1205736073289732 (ref-

(56) References Cited

OTHER PUBLICATIONS erenced in Jan. 24, 2024 Complaint, Case No. 1:24-cv-00084-UNA), in 5 pages. URL: https://gomotive.com/content-library/spec-sheet/ai-dashcam/.
"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.
"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_truckin g_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 1 page.
Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.
AutoMotoTV, "Fiat ecoDrive System" [video], YouTube, Oct. 6, 2008, screenshot in 1 page URL: https://www.youtube.com/watch?v=AUSb2dBBI8E.
Chauhan, V. et al., "A Comparative Study of Machine Vision Based Methods for Fault Detection in an Automated Assembly Machine", Procedia Manufacturing, 2015, vol. 1, pp. 416-428.
D'Agostino, C. et al., "Learning-Based Driving Events Recognition and Its Application to Digital Roads", IEEE Transactions on Intelligent Transportation Systems, Aug. 2015, vol. 16(4), pp. 2155-2166.
Dunn, B., "What is the Lytx DriveCam?", Autobytel, Jul. 12, 2014, in 1 page. URL: https://www.autobytel.com/what-is-lytx-drivecam.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
FiatFranco, ""Ciao!"—Fiat ecoDrive" [video], YouTube, Sep. 10, 2007, screenshot in 1 page URL: https://www.youtube.com/watch?v=SluE9Zco55c.
Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Gilman, E. et al., "Personalised assistance for fuel-efficient driving", Transportation Research Part C, Mar. 2015, pp. 681-705.
Ginevra2008, "Fiat EcoDrive" [video], YouTube, Mar. 7, 2008, screenshot in 1 page. URL: https://www.youtube.com/watch?v=D95p9Bljr90.
Groover, M. P., Automation, Production Systems, and Computer-Integrated Manufacturing, 2015, 4th Edition, Pearson, in 811 pages.
Han, Z. et al., "Design of Intelligent Road Recognition and Warning System for Vehicles Based on Binocular Vision", IEEE Access, Oct. 2018, vol. 6, pp. 62880-62889.
Haworth, N. et al., "The Relationship between Fuel Economy and Safety Outcomes", Monash University, Accident Research Centre, Dec. 2001, Report No. 188, in 67 pages.
Huang, K.-Y. et al., "A Novel Machine Vision System for the Inspection of Micro-Spray Nozzle", Sensors, Jun. 2015, vol. 15(7), pp. 15326-15338.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

(56) References Cited

OTHER PUBLICATIONS

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet Drive Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group Drive Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver Drive Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view the Safety Hub and Drive Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

(56) References Cited

OTHER PUBLICATIONS

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is Drive Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is Drive Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seatbelt-use (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: AI Model Development", Motive Technologies, Inc., accessed on Mar. 29, 2024 [publication date unknown], Document No. 2022Q1_849898994, in 14 pages.

Motive, "Guide: Drive risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 2 pages. URL: https://www.youtube.com/watch?v=WnclRs_cFw0.

Motive, "How to install your Motive AI Dashcam." [video], YouTube, Aug. 5, 2022, screenshot in 2 pages. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Industry-leading fleet management solutions", Motive Technologies, Inc., accessed on Feb. 18, 2024 [publication date unknown], in 13 pages. URL: https://gomotive.com/products/.

Motive, "KeepTruckin ELD Training for Drivers" [video], YouTube, Feb. 2, 2018, screenshot in 1 page. URL: https://www.youtube.com/watch?v=LKJLIT2bGS0.

(56) References Cited

OTHER PUBLICATIONS

Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The Motive Driver App: Change current duty status in your driving log." [video], YouTube, Aug. 10, 2022, screenshot in 2 pages. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 2 pages. URL: https://www.youtube.com/watch?v=qJX2ZiBGtV8.
Motive, "WiFi Hotspot", Motive Technologies, Inc., accessed on Feb. 18, 2024 [publication date unknown], in 5 pages. URL: https://gomotive.com/products/wifi-hotspot/.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab9Ow_CY.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne, "Driver•i™ Catches No Stop ad Stop Sign | Fleet Management Technology" [video], YouTube, Oct. 3, 2017, screenshot in 1 page. URL: https://www.youtube.com/watch?v=l8sX3X02aJo.
Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet

(56) References Cited

OTHER PUBLICATIONS

Management, and Video-Based Safety Systems, Devices, and Components thereof, Investigation No. 337-TA-1393), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.
Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.
Soumik Ukil, "LightMetrics ADAS demo" [video], YouTube, Jul. 20, 2017, screenshot in 1 page. URL: https://www.youtube.com/watch?app=desktop&v=9LGz1oo7dTw.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Top Fives, "15 Biggest Data Centers on Earth" [video], YouTube, Jun. 9, 2024, screenshot in 1 page. URL: https://www.youtube.com/watch?v=1LmFmCVTppo.
Vezo 360, "World's Smartest Dash Cam Powered by AI" [video], YouTube, Mar. 31, 2019, screenshot in 1 page. URL: https://www.youtube.com/watch?v=M5r5wZozS0E.
Vlahogianni, E. et al., "Driving analytics using smartphones: Algorithms, comparisons and challenges", Transportation Research Part C, Jun. 2017, vol. 79, pp. 196-206.
Yufeng, Z. et al., "3G-Based Specialty Vehicles Real-Time Monitoring System", Applied Mechanics and Materials, Feb. 2014, vols. 513-517, pp. 871-875.
Zhong, R. Y. et al., "Intelligent Manufacturing in the Context of Industry 4.0: A Review", Engineering, Oct. 2017, vol. 3, Issue 5, pp. 616-630.

\* cited by examiner

Confirm Your Video Request

Please review the details of your video.

Details

📅 Jan 17, 2022 2:41 PM

🕐 1 min

◎ High Resolution

Cameras ← 1402

Superuser Controls

☐ Mark Request as Internal

1404

Cancel | Confirm

IMAGE DATA DOWNLOAD USING A GATEWAY DEVICE

CROSS-REFERENCE TO RELATED APPLICATIONS

This application claims the benefit of priority of U.S. Provisional Patent Application No. 63/376,241, filed Sep. 19, 2022, entitled "IMAGE DATA DOWNLOAD USING A GATEWAY DEVICE," which is hereby incorporated by reference herein in its entirety and for all purposes. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to devices, systems, and methods that discover and download image data from a gateway device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Obtaining and processing data from a gateway device of a vehicle that is usable to detect, in real-time, events that are indicative of a crash or increased risk of a crash and a driver associated with the event, requires significant data storage and processing power. The data may be obtained (e.g., as streaming data) from a gateway device of the vehicle for processing via synchronous calls, however, the use of synchronous calls may limit the effectiveness and usability of the data as the data may be limited to streaming data. Thus, obtaining data from gateway devices is typically limited to streaming data with limited value for subsequent usage of the data.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments, systems and or devices may be configured and/or designed to download image data from a gateway device. Further, the systems and/or devices can utilize the downloaded image data to identify an event and identify the driver for the event from the downloaded image data. Additionally, the present disclosure describes various embodiments of image download systems and interfaces that are the result of significant development. This non-trivial development has resulted in the image download systems and interfaces described herein which may provide significant increases and advantages over previous systems including increases in efficiency, cost-effectiveness, and accuracy. The image download systems and interfaces may reduce the time required to obtain data from a gateway device. Specifically, the image download systems and interfaces may increase the reliability of the data processing such that the data is downloaded to a server and/or a user computing device in a more reliable manner as compared to existing data processing systems. For example, traditional data processing systems may result in the data being streamed to a user computing device for 35% of the videos as compared to 95% for the image download systems described herein. Therefore, the image download systems represent a significant technological improvement over traditional data processing systems. The image download systems can also increase the efficiency of the data download process when data is reused. For example, when a user attempts to review data that was previously downloaded, the image download systems can access the previously downloaded data.

Various embodiments of the present disclosure provide improvements to various technologies and technological fields, and practical applications of various technological features and advancements. For example, as described above, existing data processing systems are limited in various ways, and various embodiments of the present disclosure provide significant improvements over such technology, and practical applications of such improvements. Additionally, various embodiments of the present disclosure are inextricably tied to, and provide practical applications of, computer technology. While currently available devices may enable a system to stream data from a gateway device, such devices may not enable data from the gateway device to be downloaded and stored for playback. Further, while such devices may stream data from the gateway device via a user interface, if a user navigates away from the user interface, the data may not be reobtainable. The lack of a download process may be inefficient and unreliable. Additionally, during the data download process from a gateway device, the amount of data at the gateway device can be significant so just managing this data can be a significant issue.

Advantageously, various embodiments of the present disclosure may overcome various disadvantages of prior systems and methods. A management server system may include a computer readable storage medium having program instructions embodied therewith and one or more processors configured to execute the program instructions. The one or more processors may cause display of a first user interface. The first user interface may include a plurality of visualizations. Further, each of the plurality of visualizations may be associated with particular image data from a particular vehicle gateway device. The one or more processors may obtain, from a computing device, input, via the first user interface. The input may include a first request for image data associated with a vehicle. The one or more processors may provide, to a vehicle gateway device, storage information indicating a storage destination for the image data. The vehicle gateway device may obtain the image data from one or more image sensors. The one or more processors may initiate upload of the image data from the vehicle gateway device to the storage destination based on the storage information. The vehicle gateway device may initiate storage of the image data at the storage destination based on the storage information. The one or more processors may determine the image data is uploaded to the storage destination. The one or more processors may cause display of a second user interface based on determining the image data is uploaded to the storage destination. The second user interface may include a visualization of the image data. The image data may be downloaded to the computing device based on one or more interactions associated with the second user interface. The one or more processors may obtain, from the computing device, a second request for the image data.

The one or more processors may determine the image data is stored at the storage destination. The one or more processors may cause display of the second user interface without the vehicle gateway device reuploading the image data to the storage destination based on determining the image data is stored at the storage destination.

Advantageously, various embodiments of the present disclosure may overcome various disadvantages of prior systems and methods. A management server system may include a computer readable storage medium having program instructions embodied therewith and one or more processors configured to execute the program instructions. The one or more processors may obtain, from a computing device, a request for image data. The one or more processors may provide, to a site visibility system, storage information indicating a storage destination for the image data. The site visibility system may obtain the image data from one or more image sensors. The one or more processors may initiate upload of the image data from the site visibility system to the storage destination based on the storage information. The site visibility system may initiate storage of the image data at the storage destination based on the storage information. The one or more processors may determine the image data is uploaded to the storage destination. The one or more processors may cause display of a user interface based on determining the image data is uploaded to the storage destination. The user interface may include a visualization of the image data. The image data may be downloaded to the computing device based on one or more interactions associated with the user interface.

In various embodiments, the request for image data may indicate one or more filters. The one or more filters may indicate at least one of a particular sensor, a particular site visibility system, a particular environment, a particular activity, a particular time period, or a particular physical asset. The one or more processors may identify the image data based on the one or more filters.

In various embodiments, the one or more processors may cause display of a second user interface. The second user interface may include a plurality of visualizations, each of the plurality of visualizations associated with particular image data from a particular site visibility system. To obtain the request for image data, the one or more processors may receive input, via the second user interface, indicating the image data.

In various embodiments, the one or more processors may obtain, from the computing device, a second request for the image data. The one or more processors may determine the image data is uploaded to the storage destination. The one or more processors may cause display of the user interface without the site visibility system reuploading the image data to the storage destination based on determining the image data is downloaded to the storage destination.

In various embodiments, the one or more processors may determine a status of the site visibility system. The status may include an active status or an inactive status. Providing the storage information may be based on determining the status includes the active status. The one or more processors may cause display via one or more user interfaces of the computing device.

In various embodiments, the one or more processors may determine a status of the site visibility system. The status may include an active status or an inactive status. The one or more processors may delay provision of the storage information based on determining the status comprises the inactive status.

In various embodiments, the image data may include streaming image data.

In various embodiments, the one or more processors may stream the image data to the computing device.

In various embodiments, the site visibility system may stream the image data to the computing device.

In various embodiments, the site visibility system may stream the image data to the computing device during storage of the image data by the site visibility system.

In various embodiments, the user interface may include a user interface of the computing device.

In various embodiments, the image data may be stored at the site visibility system.

In various embodiments, the storage information may indicate a data store.

In various embodiments, the storage information may indicate a uniform resource locator.

In various embodiments, the image data may include raw image sensor data.

In various embodiments, the one or more processors may cause display of a notification via the user interface based on determining the image data is uploaded to the storage destination.

In various embodiments, the one or more processors may monitor upload of the image data from the site visibility system to the storage destination. The one or more processors may cause display of a dynamic visualization via the user interface based on monitoring the upload of the image data from the site visibility system to the storage destination. The dynamic visualization may indicate a status of the upload of the image data from the site visibility system to the storage destination. The status may include one or more of an incomplete status, a complete status, a partially complete status, a canceled status, or a paused status.

In various embodiments, the request for image data may include a request to download the image data from the site visibility system.

According to various embodiments of the present disclosure, a method can include obtaining, from a computing device, a request for image data. The method may further include providing, to a gateway device, storage information indicating a storage destination for the image data. The gateway device may obtain the image data from one or more image sensors. The method may further include initiating upload of the image data from the gateway device based on the storage information. The method may further include determining the image data is uploaded to the storage destination. The method may further include causing display of a user interface based on determining the image data is uploaded to the storage destination. The user interface may include a visualization of the image data.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 is an example user interface that may be displayed on the site monitor device and/or other devices having appropriate access rights.

DETAILED DESCRIPTION

Figure 1:
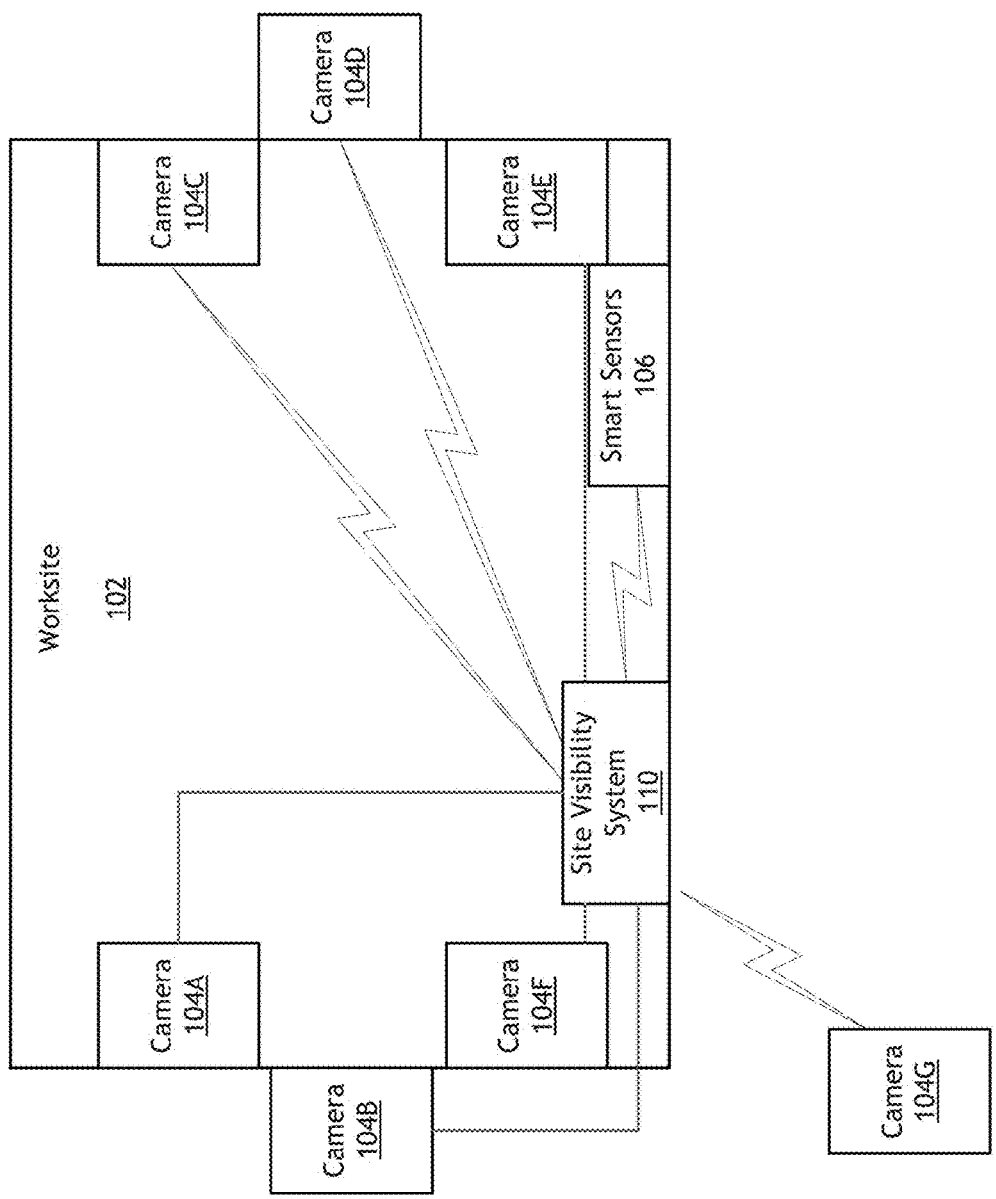
FIG. 1 is a block diagram of an example worksite with multiple cameras communicating with a video gateway device, which is referred to herein as a site visibility system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As mentioned above, according to various embodiments of the present disclosure, an improved system is configured to download data from a gateway device. For example, the improved system can download image data from a gateway device that gathers image data from a plurality of image sensors. Therefore, the improved system can enable the reliable download of the data from the gateway device (e.g., for playback, for streaming, etc.). For example, improved processes for downloading the data from the gateway device may allow any detected security events, safety events, such as driver assistance (e.g., ADAS or "Advanced Driver Assistance Systems"), harsh events, and/or other events of interest, to be more efficiently and reliably identified. In another example, a user (e.g., a security guard) may download data from a gateway device to a storage destination to enable the efficient and reliable review and management of the data. Therefore, the improved system may provide an improved process for real-time visibility for event identification and/or response. Additionally, the improved system may enable the review of historical data from gateway devices for event identification and/or response.

As discussed further herein, the system can cause display of a first user interface that may identify one or more sets of image data, one or more image sensors, one or more gateway devices, etc. The first user interface may include a visualization for all or a portion of the sets of image data, the image sensors, the gateway devices, etc. For example, the first user interface may include a first visualization identifying a scene associated with a first set of image data and a second visualization identifying a scene associated with a second set of image data. In some cases, the first user interface may include visualizations identifying image data associated with multiple image sensors and/or multiple gateway devices.

The system can receive an input (e.g., a user input) via the first user interface. For example, a user can, via a user computing device, interact (e.g., select) a particular visualization. By selecting the particular visualization, the user may indicate that the corresponding image data should be downloaded.

In response to the input, the system can define storage information for the image data. For example, the system can define a storage destination for the image data. In some cases, the storage destination may be a data store, a database, a cache, etc. For example, the storage destination may be virtual cloud storage (e.g., S3 storage). In some cases, the system can identify an identifier for the storage destination. For example, the identifier may be a link, an address, a locator (e.g., a Uniform Resource Locator ("URL")), etc. identifying the storage destination. The system can define the storage information to include the identifier.

The system can communicate the storage information to the gateway device associated with the input. For example, the user may request data associated with a particular gateway device to be downloaded and the system can communicate the storage information to the particular gateway device. Further, the system can communicate data identification information identifying a particular subset of data to be uploaded to the storage destination (e.g., based on the input).

In response to the storage information, the system can initiate download of the data from the gateway device to the storage destination. In some cases, the gateway device can initiate upload of the data from the gateway device to the storage destination. For example, the gateway device can utilize the storage information to store the data at the storage destination. The gateway device can directly upload the data to the storage destination. In some cases, simultaneously or separately, the system can stream the data (e.g., for display via a user interface) from the storage destination and/or the gateway device. For example, the system can stream the data to a user computing device while the data is being uploaded from the gateway device to the storage destination.

The system can monitor the download of the data from the gateway device to the storage destination. For example, the system can ping the gateway device to determine a status of the upload of the data by the gateway device. Further, the system can monitor the storage destination to determine whether a particular amount of data is stored at the storage destination, whether the gateway device is actively writing data to the storage destination, etc. Based on monitoring the download of the data from the gateway device to the storage destination, the system can determine the download of the data is complete. In some cases, the system can determine the download of the data is complete based on a timeout period (e.g., five minutes, ten minutes, etc.).

In some cases, the system can cause display of visualizations (e.g., toasts) indicating a status of the download of the data. For example, the system can display and periodically or aperiodically update a visualization that indicates a status of the download as incomplete, failed, not yet started, complete, etc. Further, the system can display and periodically or aperiodically update the visualization to indicate a status of a particular gateway device. For example, the status of a gateway device may be offline, online, occupied (e.g., busy), registered, non-registered, etc.

Based on determining the download of the data is complete, the system can cause display of a second user interface. The second user interface can include a visualization of the downloaded data. Further, the second user interface can include one or more interactive elements. By interacting with the one or more interactive elements, a user may initiate a download process and the system may download the data from the storage destination to a user computing device.

The system can receive additional requests for the image data. For example, the system can receive a first request and a second request for particular image data. In response to determining that the image data was not previously uploaded to the storage destination and/or downloaded by the user computing device, the system may initiate the data download process with the gateway device. In some cases, if the system determines that the image data was previously uploaded to the storage destination and/or downloaded by the user computing device, the system may omit the data download process with the gateway device. Therefore, the system can cause display of the second user interface without redownloading the image data from the gateway device.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Backend Server System (also referred to herein as a "management server system", "backend," "cloud," or "cloud server"): one or more network-accessible servers configured to communicated with devices, sensors (e.g., cameras), gateway devices, (e.g., via a vehicle gateway device and/or communication circuitry of a dashcam). A management server system is typically configured to communicate with multiple gateway devices. Thus, the management server system may have context and perspective that individual gateway devices do not have. For example, the management server system may include data associated with a large quantity of vehicles, such as vehicles across a fleet, multiple fleets, and/or within a geographic area. Thus, the management server system may perform analysis of asset data across multiple vehicles and between groups of vehicles (e.g., comparison of fleets operated by different entities). A backend server system may also include a feedback system that periodically updates event models used by gateway devices to provide real-time detection of events, such as safety events, that may trigger alerts. For example, when the backend server has optimized an event model based on analysis of asset data associated with many safety events, an updated event model may be sent to the gateway devices.

Camera: an electronic device that includes one or more sensors configured to obtain video data and/or audio data. Cameras at a worksite, for example, may be manufactured by multiple entities and have varying capabilities. For example, some cameras (e.g., particular models of cameras) may stream only a single resolution of video data, such as a high-resolution video stream, while other cameras may stream both a high-resolution video stream and a low-resolution video stream. The cameras may be in communication with a local gateway device, or local site visibility system, via one or more wired and/or wireless connections, such as via a local area network.

Gateway Device (also referred to herein as a "gateway," a "video gateway device," etc.): a device which is configured to communicate with one or more sensors (e.g., cameras). For example, the gateway device may be a vehicle gateway device in a vehicle communicating one or more sensors in the vehicle, e.g., in a separate dashcam mounted in the vehicle, and to a backend server system. In some embodiments, a vehicle gateway device can be installed within a vehicle by coupling an interface of the vehicle gateway to an on-board diagnostic (OBD) port of the vehicle. A gateway device may include short-range communication circuitry, such as near field communication ("NFC"), Bluetooth ("BT"), Bluetooth Low Energy ("BLE"), etc., for communicating with sensors and/or other devices within a particular proximity.

Network Discovery Protocols: Any process that may be performed to identify possible cameras connected to a network. Certain specific examples of network discovery protocols are discussed herein, but the systems and methods for camera discovery and communication are not limited to only those network discovery protocols specifically discussed herein. Depending on the implementation, network discovery protocols may be entirely automatic, discovering and authenticating all cameras on a network without human intervention, and/or may involve some level of human interaction, such as provision of login credentials for a particular identified camera. Network discovery protocols may include, for example:

AXIS: certain cameras may be configured to communicate using the axis protocol, which allows automatic discovery of any such devices within a network. For example, an AXIS enabled device may automatically be assigned an IP address when connected to a network (e.g., from a DHCP server) so a request to the IP address assigned to an AXIS device allows communication with the device. Similarly, devices may use the Bonjour protocol from Apple to automatically discover devices within a network configured for discovery via that protocol.

Nmap (Network Mapper): a network scanner that discovers hosts and services on a computer network by sending packets and analyzing the responses. For example, Nmap may identify open RTSP (Real-Time Streaming Protocol) ports on a network. RTSP defines control sequences that may be useful in coordinating multimedia transmission, such as streaming video data from a camera supporting RTSP communications.

ARP (Address Resolution Protocol): network scanning protocol that identifies MAC (Media Access Control) addresses of devices on a network. For example, an ARP request may be sent to an IP address on a network requesting the MAC address of the associated device. The MAC address may then be mapped to that IP address. For example, the first three alphanumeric characters of a MAC address may be specific to a manufacturer and model of a device.

The MAC address of a device is a unique identifier assigned to a network interface controller (NIC), such as a NIC that coordinates communications with a camera. As discussed further herein, MAC addresses may be used to identify a manufacturer and/or model of an identified device, such as the manufacturer and model of an identified camera on a network.

ONVIF (Open Network Video Interface Forum): an industry standard for the interface of physical IP-based security devices. ONVIF defines a network video communication framework that includes device discovery. Once an ONVIF device has been assigned an IP address (e.g., from a DHCP server), gateways (or other devices) on the network can discover the device IP address using an ONVIF device discovery request. During device discovery, the gateway may send queries on the network to a multicast address and an ONVIF device on the network will receive the query and answer to the gateway. The reply may include device information, including the device's IP address.

Host Scan: Any scan for host devices on a network. A host scan may be performed on all IP addresses within a network or certain subnets with the network.

High-resolution video stream: video files that are renderable to depict significant detail. For example, high-resolution video may be 1080p or 1440p video. The term high-resolution video does not signify any particular resolution or frame rate, but more generally indicates a video file that holds more image detail than a corresponding low-resolution video.

Low-resolution video stream: video files that are renderable to depict less detail than a corresponding standard or high-resolution video file. For example, low-resolution video may be 240p or 360p or less. The term low-resolution video does not signify any particular resolution or frame rate, but more generally indicates a video file that holds less image detail than a corresponding high-resolution video.

Standard-resolution video stream: video files that are renderable to depict less detail that high-resolution video files. For example, standard-resolution video may be 720p video. The term standard-resolution video does not signify any particular resolution or frame rate, but more generally indicates a video file that holds less image detail than high-resolution video and more detail than low-resolution video.

Event Data: data associated with an event, such as a set of sensor data (e.g., metadata and/or asset data), such as photographs, video files, etc., associated with a detected safety event.

Feature detection: a computerized process that processes video data to identify features in one or more images of the video data and which may be provided to one or more even models to determine if an event of interested is detected. Feature detection may be performed by a local site visibility system and/or at a cloud site visibility system to detect events of interest, such as safety events.

Event Model (or "triggering criteria"): a set of logic that may be applied to sensor data to determine when an event has occurred. An event model may be, for example, an algorithm, statistical model, or neural network that takes as input one or more types of sensor data, such as a standard-resolution video stream from each of one or more cameras. An event model may be stored in any format, such as a list of criteria, rules, thresholds, and the like, that indicate occurrence of an event. Event models may also receive input from a feature detection component configured to detect features in video data. Event models may be executed by a local and/or cloud site visibility system.

Event models and/or feature detection may be performed by using machine learning components that can be used to assist in identification of features (e.g., a person within a restricted area) that may trigger events. For example, a machine learning component can implement machine learning algorithms or artificial intelligence (AI) to generate and/or update neural networks that are executed by a processor (e.g., at a local and/or cloud site visibility system). In some embodiments, the machine learning component can use one or more machine learning algorithms to generate one or more models or parameter functions for the detections. A feature detection module may comprise a plurality of layered and/or hierarchical models that each produce an output that is pooled together. Further, the feature detection module may comprise a thin layer of models that is independently defined and tunable. The machine learning component can be configured to generate an event model that understands which types of data indicate which types of detections. One or more of these event models may be used to determine an expected value or occurrence based on analysis of received data. In some embodiments, event models can include event detection criteria designated by a user, admin, or automatically. For example, the criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the local site visibility system may be regenerated on a periodic basis (e.g., by the cloud site visibility system) as new received data is available to help keep the predictions in the event detection model more accurate as the data is collected over time.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Camera Systems and Functions

FIG. 1 is a block diagram of an example worksite 102 with multiple cameras 104 communicating with a video gateway device, which is also referred to herein as a site visibility system 110. The worksite 102 may represent a single room, such as a workroom of a manufacturing facility, or may represent multiple rooms, buildings, and/or outdoor areas. For example, in another embodiment, the worksite 102 includes multiple buildings and/or outdoor areas associated with a particular entity, such as a business campus of a company that includes multiple buildings and outdoor locations.

In the example of FIG. 1, the site visibility system 110, which may also be referred to as a local site visibility system or video gateway, communicates with each of multiple cameras 104 at or near the worksite 102. Depending on the implementation, cameras may be connected via wired connections, such as cameras 104A, 104B, 104F, 104E in the example of FIG. 1, or via wireless connections, such as cameras 104G, 104C, and 104D in the example of FIG. 1. Additionally, the cameras may be manufactured by different entities and have different capabilities. For example, camera 104A may be configured to output only a single video stream (e.g., a high-resolution video stream), while camera 104B may be configured to output multiple video streams (e.g., a high-resolution and a low-resolution video stream). Advantageously, the site visibility system 110 is configured to automatically identify cameras connected to the network (e.g., a secured local area network), authenticate with the cameras, and determine capabilities of each the cameras 104, which may be useful in customizing any video stream generation processes that are based on the particular capabilities of particular cameras, as discussed further below.

FIG. 1 also includes smart sensors 106 which represent additional sensors that may be configured to communicate with the site visibility system 110. Any other type of sensor, such as temperature, moisture, motion, distance, etc. may be installed at the worksite 102 and configured to communicate with the site visibility system 110 either wirelessly or via a wired connection.

Figure 2:
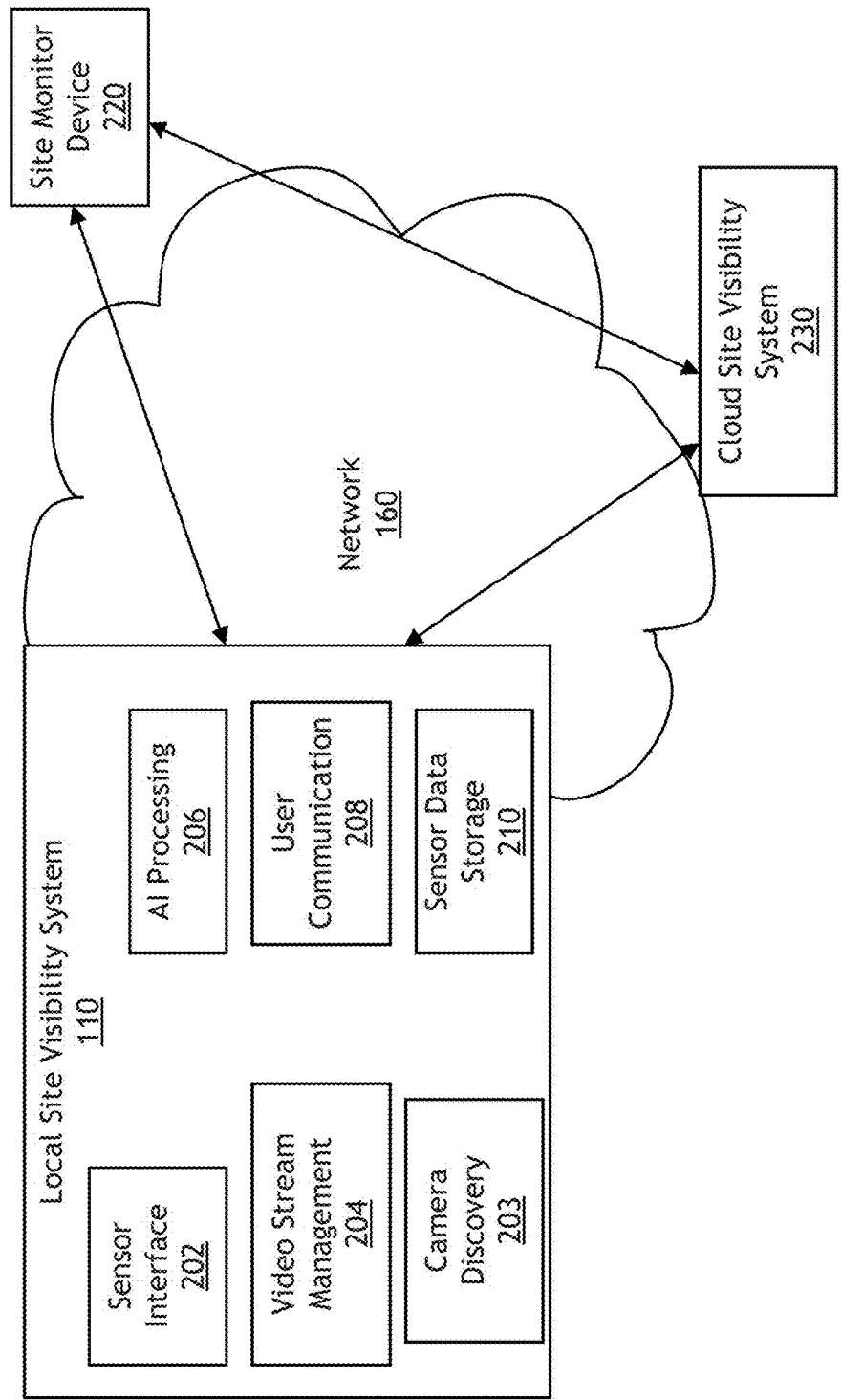
FIG. 2 is a block diagram of the example site visibility system (or "local" site visibility system) in communication with a site monitor device and with a cloud site visibility system.

FIG. 2 is a block diagram of the example site visibility system 110 (or "local" site visibility system 110) in communication with a site monitor device 220 and with a cloud site visibility system 230. In this example, the local site visibility system 110 communicates sensor data, such as one or more video streams acquired from cameras 104, to the site monitor device 220, which may be a mobile phone, tablet, laptop, desktop computer, or other device, operated by a site manager, which generally denotes an individual that has an interest in monitoring activity at the worksite 102, such as a site manager, owner, safety manager, etc.

Figure 3:
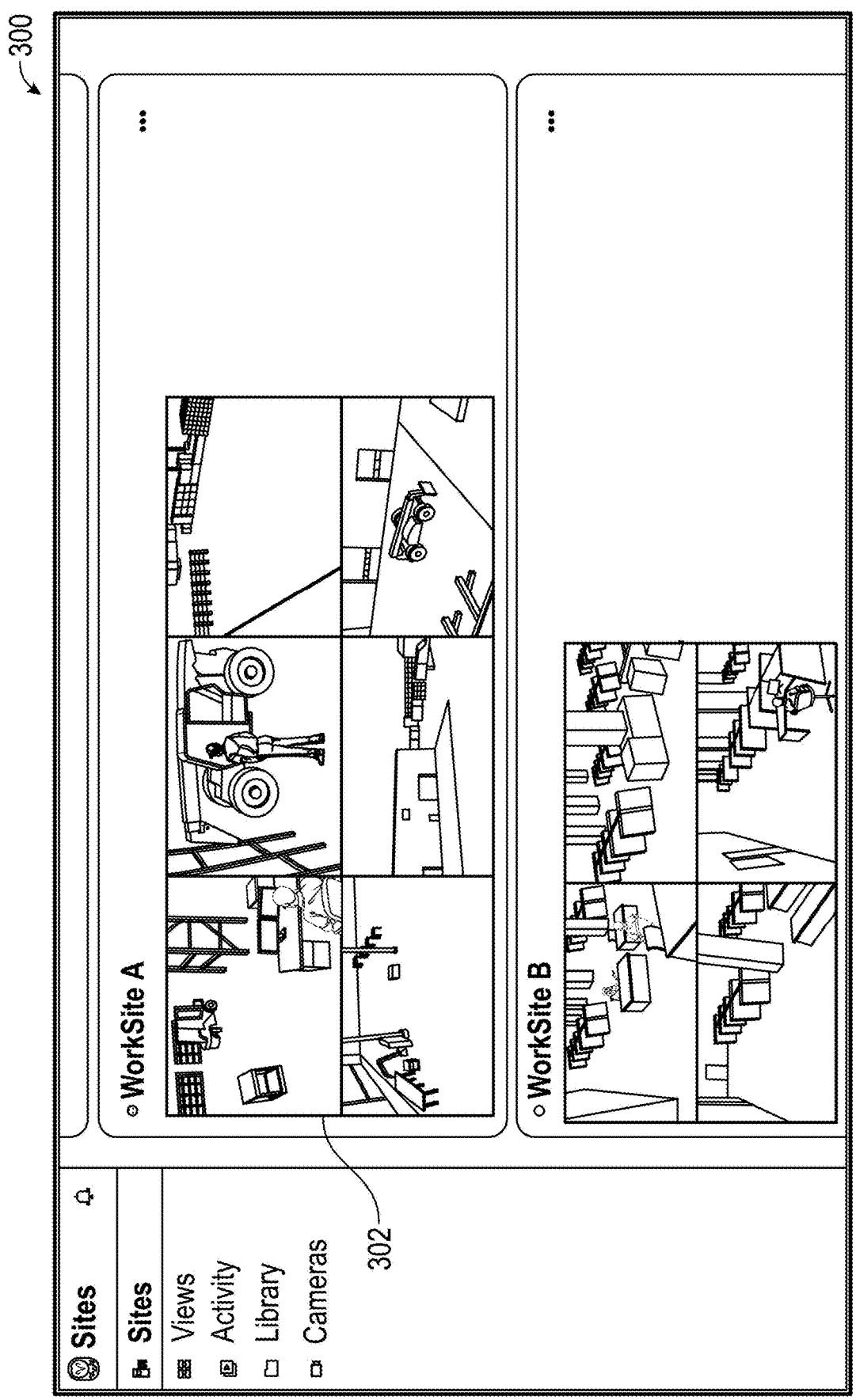
FIG. 3 is an example monitoring user interface that may be displayed on the site monitor device.

FIG. 3 is an example monitoring user interface 300 that may be displayed on the site monitor device 220. In the example of FIG. 3, video stills from each of two different worksites are displayed. The video stills may each be acquired from different cameras at the corresponding worksite. In one embodiment, the video stills, and corresponding video streams that are requested by the user, are received at the site monitor device 220 from the local site visibility system 110. In some embodiments, the video stills and/or corresponding video streams are received from the cloud site visibility system 230. In some embodiments, certain video streams and/or related metadata may be received from the local site visibility system 110, while other types of video streams and/or related metadata may receive from the cloud site visibility system 230.

In one embodiments, some or all of the video stills are replaced with live video streams from the corresponding cameras. For example, low-resolution video streams associated with the cameras may be displayed in the monitoring user interface 300. As discussed further below, for some cameras the low-resolution video stream may be generated by down sampling another video stream from the particular camera, while other cameras may generate a low-resolution video stream suitable for thumbnail display and rendering. In some embodiments, the monitoring interface 300 includes video stills from each of the cameras, and a user input associated with a particular video still causes the low-resolution video stream from that site to replace the video still. For example, the user may hover a pointer over image 302, or perform a particular gesture associated with image 302, to cause the video still image 302 to be replaced with a live video stream from the corresponding camera.

In the example of FIG. 3, each of the video stills may be selected to initiate display of a high-resolution video stream associated with the video still. For example, a user could select image 302 to initiate display of a high-resolution video stream in a new window, or replacing the video stills shown in FIG. 3.

The local site visibility system 110 may also communicate with the cloud site visibility system 230, such as to provide sensor data (e.g., video stream and/or other sensor data) for further analysis, such as to determine whether triggered alerts are accurate and to generate updated models for triggering such alerts.

In the example of FIG. 2, the local site visibility system 110 includes a camera discovery component 203 that is configured to discover newly installed cameras on a network, such as cameras installed/added at a business site. The camera discovery component 203 may periodically scan the network 160 (e.g., a local area network and/or remote networks, such as other networks associated with an entity) for new cameras using multiple camera protocols, such as queries for AXIS cameras, running Nmap to find hosts with open RTSP ports, port 80 scans to find HTTP interfaces, and/or other processes to identify cameras connected to the network. For potential cameras where a MAC address may be identified (e.g., cameras or other devices on the network that have MAC addresses), the MAC address can be looked up in a database of camera MAC addresses to identify the particular camera manufacturer, model, and/or characteristics.

For each located camera, the camera discovery component 203 is configured to automatically attempt authentication, starting with a series of known authentication credentials (e.g., combinations of usernames and passwords) for the particular camera type (and/or other camera characteristics) that were acquired over time from multiple sites. When authenticated, a still image from the camera and capabilities of camera may be retrieved, including channels (e.g., URLs) for different video and audio streams provided by the camera. Additionally, video stream capabilities of each camera may be identified and, based on the capabilities, a determination may be made as to whether any additional video steams need to be created for particular cameras.

Figure 5:
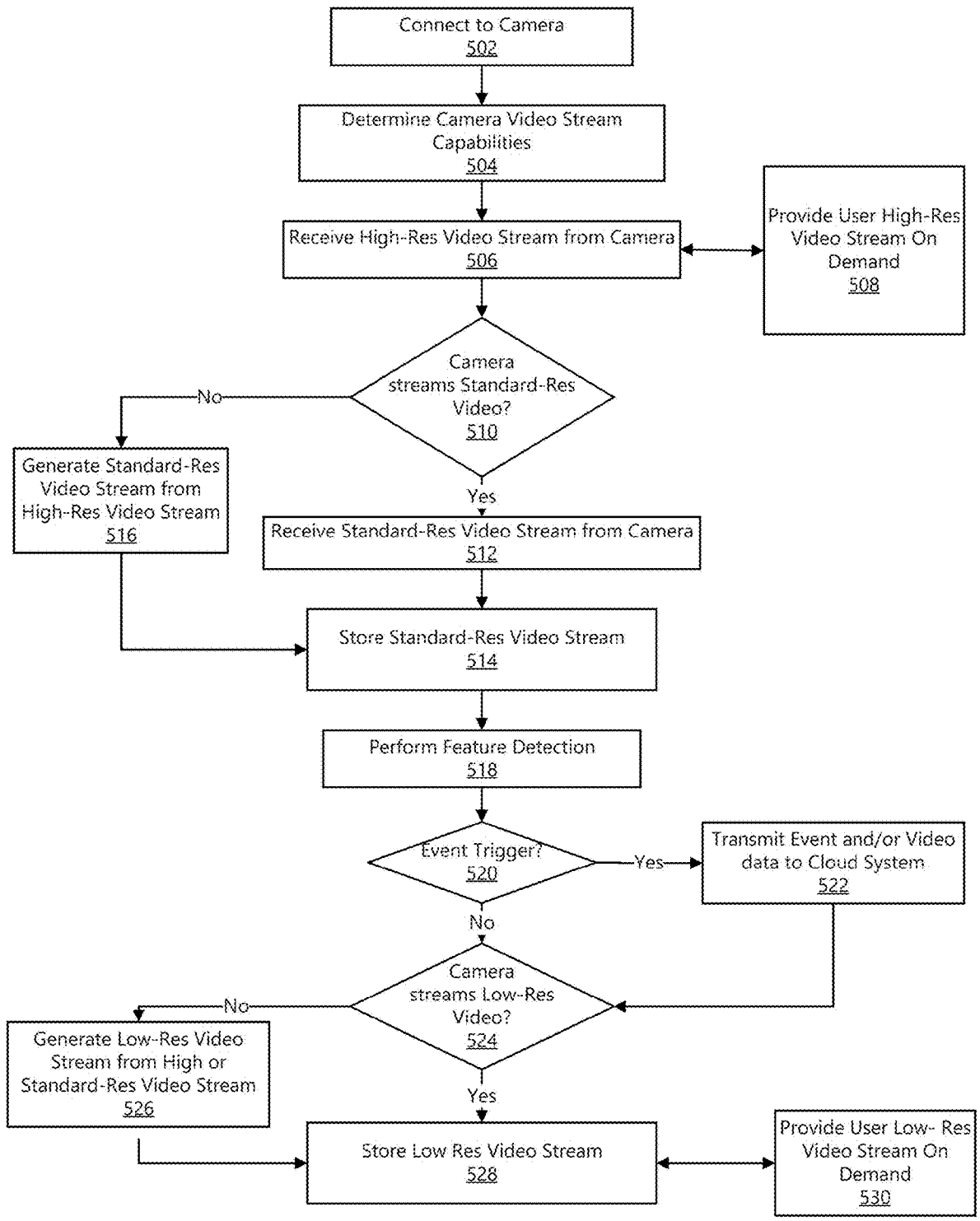
FIG. 5 is a flowchart illustrating an example of one embodiment of a process that may be performed by a local site visibility system.

In the example embodiment of FIG. 2, the local site visibility system 110 includes a sensor interface 202, which generally is any hardware and/or software components that are configured to communicate with sensors, such as the cameras 104 and the smart sensors 106 of FIG. 1. The video stream management component 204 is configured to determine video streaming capabilities of specific cameras and generate additional video streams for particular cameras, as needed. FIG. 5, discussed below, provides one example workflow that may be performed by the video stream management component 204.

The sensor data storage 210 stores video streams received from cameras 104 and/or generated by the video stream management component 204. For example, the sensor data storage 210 may be configured to store a certain rolling time period (e.g., the last 48 hours) of high-resolution and standard-resolution video data, and another longer rolling time period (e.g., the last 96 hours) of low-resolution video data. The sensor data storage 210 may include one or multiple storage devices, such as hard drives, servers, and/or server farms to facilitate storage of the sensor data. In some embodiments, certain sensor data may be offloaded from the sensor data storage 210 to a storage system associated with the cloud site visibility system 230. For example, certain snippets of video data associated with any detected event, e.g., 30 seconds before and 30 seconds after, may be stored by the cloud site visibility system 230 for some longer time (e.g., six months or longer).

The AI processing 206 generally performs feature detection on the sensor data, e.g., video data from the cameras 104 and/or other sensor data from the smart sensors 106, such as to identify events of interest. For example, an event of interest at a manufacturing facility might be to indicate that an assembly line has stopped moving for a certain period of time, such as based on analysis of the video stream from one or more cameras having the assembly line within their field of view. The AI processing component 206 may include machine learning, neural network, and/or other artificial intelligence algorithms that generate and/or update models for detection of certain events. For example, in some embodiments, users may provide feedback on accuracy of identified features and/or events. For example, a user may indicate that video data associated with a "stopped line" event that was detected by the AI processing 206 does not actually show a stopped assembly line, but rather shows a large object blocking much of the cameras view of the assembly line. With this feedback, the AI processing 206 may update and/or optimize a model for triggering a stopped line event so that similar false positive event detections occur in the future.

In some embodiments, the cloud site visibility system 230 also includes an AI processing component, which may be more robust than the AI processing 206 at the local site visibility system 110. Thus, in some embodiments, model optimization is performed at the cloud site visibility system 230, such as based on one or more video streams that are provided by the local site visibility system 110. In some embodiments, a standard-resolution video stream, which typically is generated by the local site visibility system 110 based on another resolution video stream from a camera, is used in the feature detection and other AI processing.

In some embodiments, the cloud site visibility system 230 maintains information that is used by the camera discovery component 203, such as an authentication credentials database. For example, authentication credentials associated with various characteristics of cameras (e.g., manufacturer, model, capabilities, etc.) that are obtained from multiple sites (e.g., tens, hundreds, thousands, or more sites similar to worksite 102) as cameras are authenticated at those sites. Thus, the cloud site visibility system 230 may advantageously identify authentication credentials that are most likely to be accepted for future authentication requests at other sites. In some embodiments, when the camera discovery component 203 identifies a new possible camera on the network 160, a highest ranked (or multiple of the highest rank) authentication credentials for the possible camera are obtained from the cloud site visibility system 230 for use in automatically authenticating with the new possible camera.

User communication compartment 208 is configured to communicate with one or more external devices, such as the site monitor device 220 and/or the cloud site visibility system 230. In some embodiments, the communication component 208 provides sensor data, such as low-resolution and/or high-resolution video streams from one or more cameras, to the site monitor device 220, such as at the request of the user of the site monitor device 220.

Figure 4:
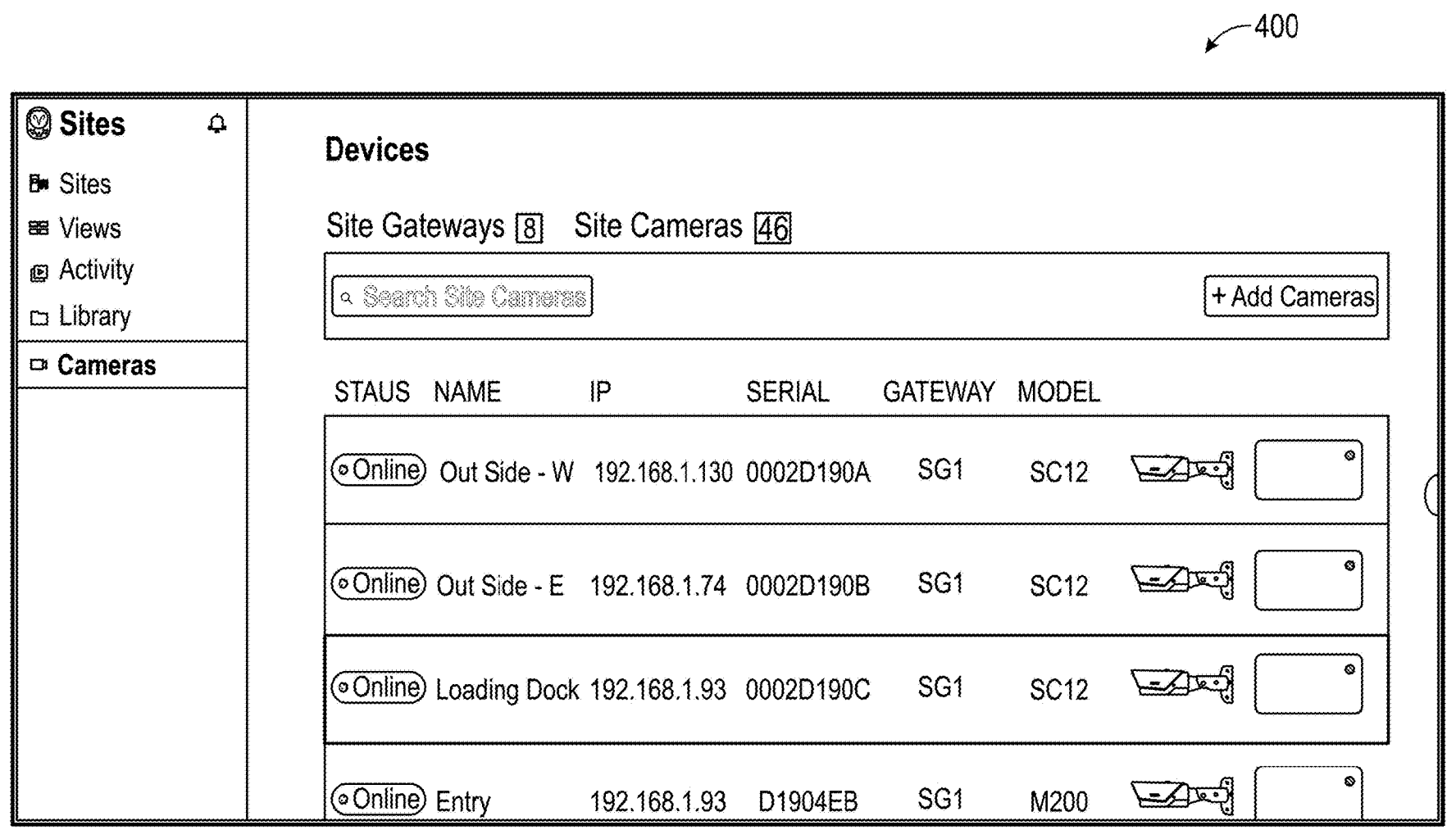

FIG. 4 is an example user interface that may be displayed on the site monitor device 220 and/or other devices having appropriate access rights. In this example, general information regarding each of the cameras at a site is displayed. In this example, for each camera, information including a status, camera name, IP address, serial number, gateway, camera model, image of the camera, and a still video image from the camera, may be displayed. The user interface 400 includes these details regarding five cameras, which are each associated with a same gateway (e.g., "SG1") at a particular worksite. In some implementations, a worksite may include multiple gateways (e.g., local site visibility system 110) that are each in communication with a different set of sensors. For example, multiple gateways, such as multiple local site visibility systems 110, may be located at a worksite and each include the same or similar components and functions. In embodiments with multiple gateways, one gateway may be designated as a primary gateway that monitors and coordinates video streaming and downsampling activities performed by other gateways. In the example of FIG. 4, the first three cameras are a same model ("SC12"), while the last camera is a different model ("M200"). As discussed elsewhere herein, the video stream management component 204 is advantageously configured to determine video streaming capabilities of different cameras and to determine whether any additional video streams for a particular camera should be generated.

FIG. 5 is a flowchart illustrating an example of one embodiment of a process that may be performed by a local site visibility system 110, such as by the various components of the local site visibility system 110 discussed above. In other embodiments, the method may include fewer and/or additional blocks and/or the blocks may be performed in order different than as illustrated. For ease of explanation, the process of FIG. 5 is discussed below with reference to communications with a single camera. However, the same process may be performed for each of multiple cameras in communication with the system 110, such as multiple cameras at a particular worksite.

Figure 6:
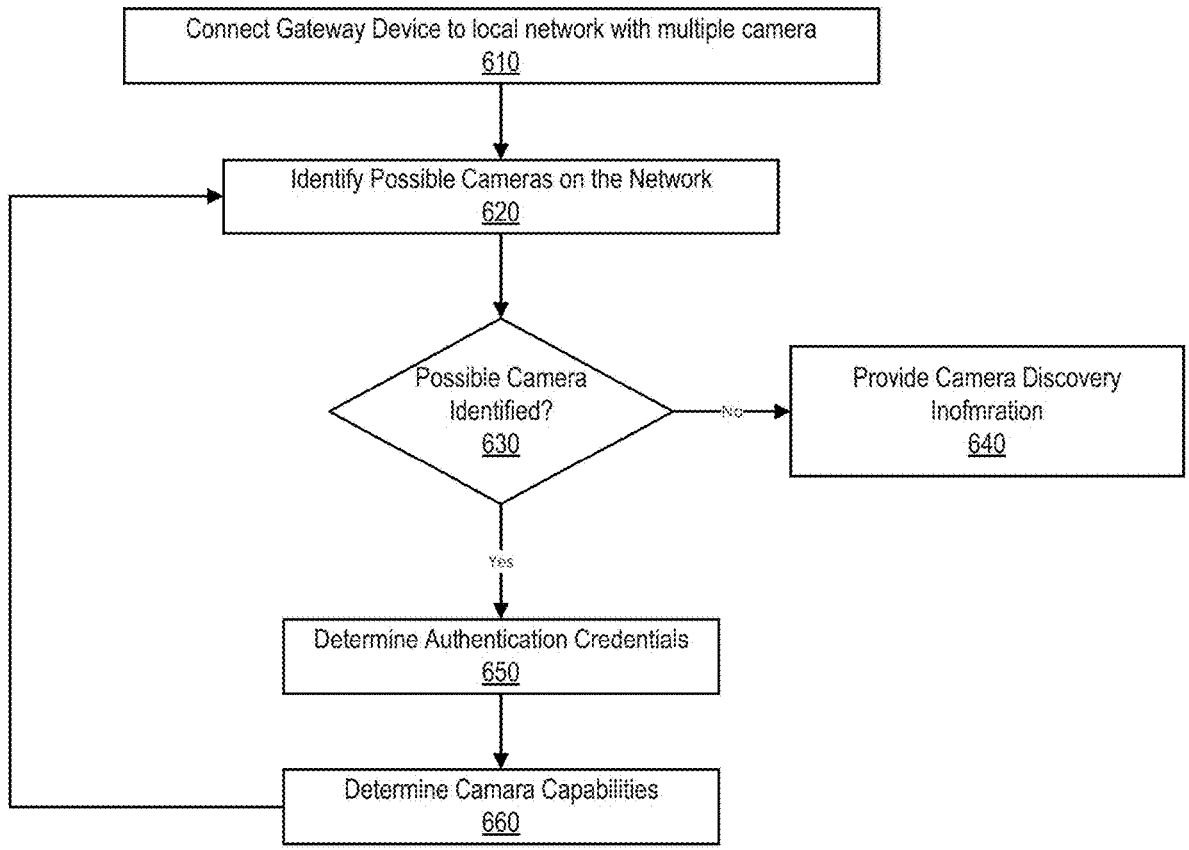
FIG. 6 is a flowchart illustrating one embodiment of an example process of discovering multiple cameras at a worksite that are already connected to a network when a video gateway device is connected.
Figure 7:
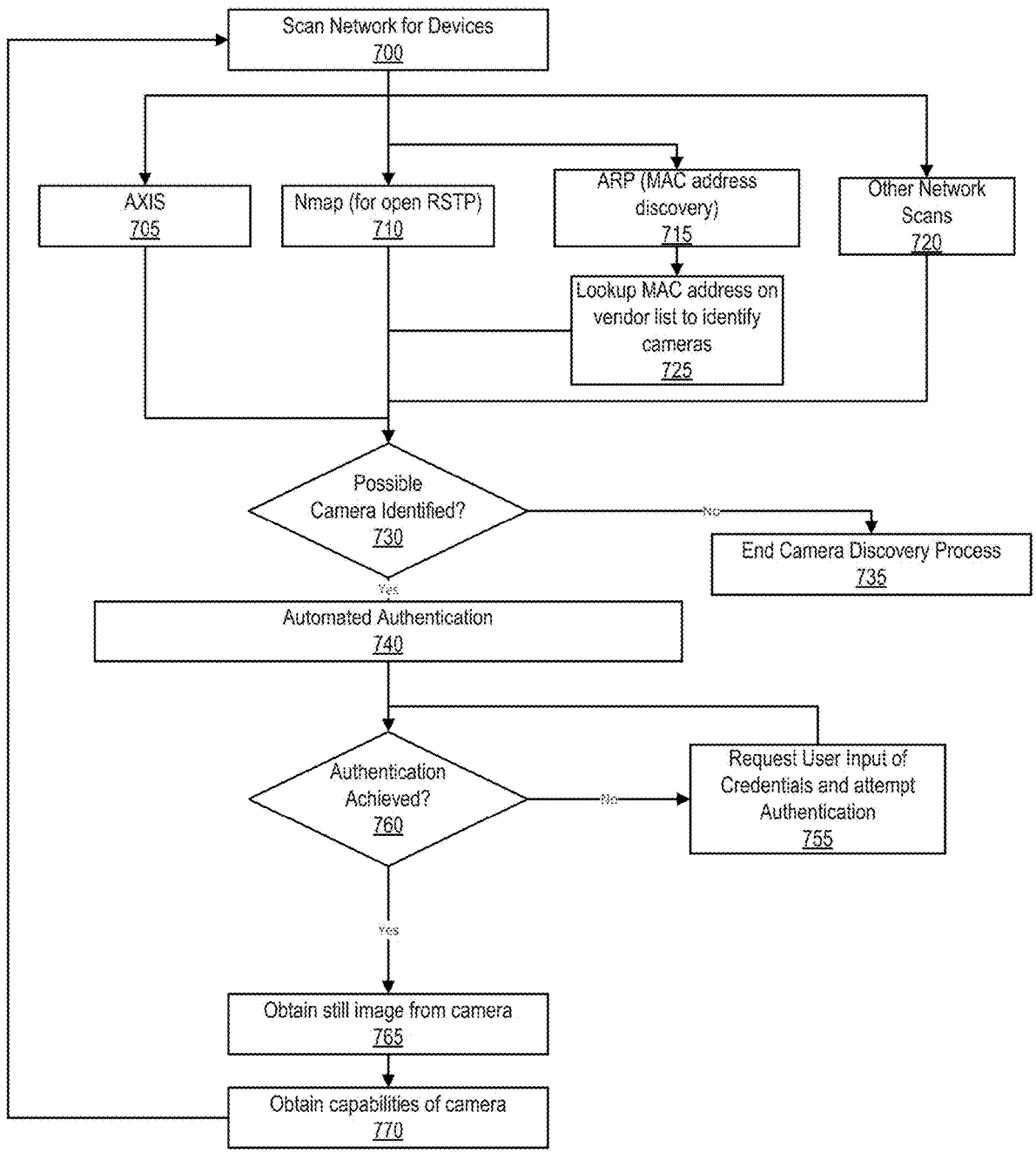
FIG. 7 is a flowchart illustrating one embodiment of an example method for discovering and establishing communication channels with cameras on a network.

Beginning at block 502, the system 110 establishes a communication channel with a camera. For example, when a camera is first powered on at a worksite, the local site visibility system 110 may be configured to establish a communication link, either wired or wireless, with the camera. FIGS. 6 and 7, discussed further below, describe example systems and methods for discovering possible cameras on a network and automatically authenticating with the identified cameras.

Next, at block 504, the system 110 determines video streaming capabilities of the camera. For example, some cameras may stream only a high-resolution video stream, while others may stream multiple video streams, such as a high-resolution and a low-resolution video stream. In some embodiments, the processes of blocks 502 and 504 are performed only a single time, such as when a new camera is added to a worksite and connected to the system 110.

Moving to block 506, a high-resolution video stream from the camera is received and provided to one or more site monitor devices 220 (at block 508), such as on-demand. In some embodiments, the high-resolution video stream may only be transmitted to the system 110 upon request for the video stream. For example, a site monitor device 220 may open a user interface for display of high-resolution video from the camera, and the system 110 may correspondingly request transmission of the high-resolution video stream from the camera. In other embodiments, the high-resolution video stream may be continuously streamed and stored, such as on the sensor data storage 210, for a particular time period and/or using a particular amount of storage space. For example, a predetermined amount of storage space may be allocated for high-resolution video streams from all of the cameras in communication with the system and/or individual high-resolution video storage limits for individual cameras.

Next, at block 510, the system accesses the camera capabilities (that were determined at block 504) to determine whether the camera streams a standard-resolution video stream. If the camera does stream a standard-resolution video stream, the process continues to block 512 where the camera transmits the standard-resolution video stream to the system, such as for storage (block 514) in the sensor data storage 210. The storage time of the standard-resolution video stream (and/or other video stream resolutions) may vary depending on the implementation. In some embodiments, the standard-resolution video stream is discarded (e.g., deleted from storage) after it has been processed, such as processed by the feature detection of block 518. In some embodiments, and as noted above with reference to storage of the high-resolution video stream, a standard-resolution video stream may be continuously streamed or streamed on-demand, and may be allocated a certain amount of storage space and/or standard-resolution video time period.

If at block 510 the system determines that the camera does not stream standard-resolution video, the method continues to block 516 where the system generates a standard-resolution video stream from the high-resolution video stream. For example, the high-resolution video stream may be downsampled to generate a standard-resolution video stream.

Once a standard-resolution video stream from the camera is received (block 512) and/or generated (block 516) at the system 110, at block 518 feature detection and/or other artificial intelligence and/or machine learning processes may be performed on the standard-resolution video stream. Advantageously, the standard-resolution video stream includes enough details regarding features to allow accurate feature detection to be performed, while not requiring as much storage space and processing time as would be required for feature detection on a high-resolution video stream. Similarly, while the standard-resolution video stream requires additional storage space than a low-resolution video stream, the level of feature detection accuracy may be greatly improved with the level of detail in the standard-resolution video stream. In other embodiments, other video streams may be used in feature detection, such as the high-resolution video stream and/or low-resolution video stream. In some embodiments, feature detection at the local site visibility system 110 may be performed using the standard-resolution video stream, and feature detection at the cloud site visibility system may be performed using high-resolution video streams, such as to detect features that may not be easily detectable in the standard-resolution version of the video stream.

Next, at block 520, the system 110 monitors the feature detection performed at block 518 for detection of an event. Depending on the embodiment, an event may be associated with one or multiple features being detected in the standard-resolution video stream. For example, a first event may be triggered only when each of two different features are detected within a certain time period, while another event may be triggered by detection of only a single feature in a single standard-resolution video frame.

If any event trigger is detected at block 520, the process continues to block 522 where information regarding the event, such as an indication of the triggering event, video data associate with the event, and/or metadata regarding the event, may be transmitted to the cloud site visibility system for further processing. For example, a cloud site visibility system may analyze the standard-resolution video stream in greater detail than the local site visibility system 110 and/or may analyze other sensor data, such as a high-resolution video stream, to determine whether the triggered event is accurate and/or to update or otherwise optimize the model and/or rules used to trigger the particular event. In some embodiments, certain events may trigger transmission of an alert to one or more users, such as a user of a site monitor device 220.

Next, at block 524, the system 110 determines whether the camera streams a low-resolution video stream. If not, the method continues to block 526, where a low-resolution video stream is generated from the high-resolution or standard-resolution video stream. Once the low-resolution video stream is either generated (block 526) or received directly from the camera (block 528) the system 110 stores portions of the low-resolution video stream. For example, low-resolution video from a predefined time period, e.g., a previous 48 hours, may be stored at the local site visibility system 110, and provided to one or more site monitor devices for viewing at block 530. In some embodiments, low-resolution video may only be accessed and stored at the system 110 upon request by a site monitor device. In some embodiments, the low-resolution video stream is transmitted to the cloud site visibility system for analysis and/or storage. For example, a local site visibility system may store a first time period of low-resolution video stream (e.g., 48 hours), while a cloud site visibility system may store a second, extended, time period of low-resolution video stream (e.g., two weeks).

Example Camera Discovery

In addition to cameras having different video streaming capabilities, such as discussed above, cameras from different manufacturers and different models have different communication protocols. Thus, particularly for an existing multi-camera arrangement at a worksite, for example, multiple models and types of cameras may be pre-existing when the video gateway device (e.g., local site visibility system 110) is installed. Establishing communications with such various cameras typically involves several manual processes of identifying cameras on the network, determining communication protocols of those cameras, and authenticating the gateway device with the cameras so that video feeds (and/or other sensor data from the cameras) may be received. As discussed herein, a camera discovery component of a video gateway device (e.g., camera discovery component 203 of local site visibility system 110) may perform a series of automated processes for identifying cameras connected to a network (or multiple networks in some embodiments) and authenticating the gateway device with each of the cameras, typically without user intervention.

In one embodiment, a gateway device periodically scans the local network for new cameras using multiple camera protocols, such as queries for AXIS cameras, running Nmap to find hosts with open RTSP ports, and port 80 scans to find HTTP interfaces. Any MAC addresses identified may then be looked up in a database of camera MAC addresses to identify camera manufacturers and models. For each located camera, authentication is performed, starting with a series of known authentication credentials (e.g., combinations of usernames and passwords) for the particular camera type that are acquired over time from multiple sites, such as may be maintained by the cloud site visibility system in an authentication credentials database or other data structure. When authenticated, a still image from the camera and capabilities of the camera may be retrieved, including channels (e.g., URLs) for different video and audio streams provided by the camera.

FIG. 6 is a flowchart illustrating one embodiment of an example process of discovering multiple cameras at a worksite that are already connected to a network when a video gateway device is connected. Depending on the embodiment, the method of FIG. 6 may include fewer or additional blocks and/or the blocks may be performed in order different than as illustrated.

Beginning at block 610, the gateway device is connected to a local network with multiple cameras already on the network. As discussed above, the cameras may be from different manufacturers and have different capabilities, including communication protocols and requirements.

Next, at block 620, the gateway device identifies possible cameras on the network, such as by using multiple device discovery processes that are discussed below with reference to FIGS. 7 and 8, for example. At block 630 if a possible camera is identified (e.g., a device on the network that could be a camera, but could be another device connected to the network), the method continues to block 650, where the gateway device determines authentication credentials for the possible camera, such as using a process similar to discussed below with reference to FIG. 9. With the camera authenticated, capabilities of the camera may be determined at block 660, and then the method returns to block 620 to identify additional possible cameras on the network. Once all cameras have been identified, the method continues to block 640 where information regarding the discovered cameras is provided to a user, such as via one or more user interfaces.

FIG. 7 is a flowchart illustrating one embodiment of a method for discovering and establishing communication channels with cameras on a network. In some implementations, the method of FIG. 7 may be performed by a video gateway device, such as by the camera discovery component 203 of the local site visibility system 110 in FIG. 2. In other embodiments, other devices may perform some or all of the processes discussed with reference to FIG. 7. Depending on the embodiment, the method of FIG. 7 may include fewer or additional blocks and/or the blocks may be performed in an order different than is illustrated.

Beginning at block 700, multiple processes for identifying cameras (or possible cameras) on the network are performed. For example, the video gateway device may scan a network for IP addresses, such as from a DHCP server, and then go through multiple possible communication protocols used by cameras to identify cameras on the network and establish an authenticated communication channel with the cameras. In the example of FIG. 7, establishing a communication channel with AXIS protocol devices is shown in block 705, using a Nmap hostname discovery process to identify open RSTP ports that may be associated with cameras on the network is shown in block 710, requesting MAC addresses (e.g., ONVIF) of devices on the network using ARP is shown in block 715, and other network scans that may be performed to identify and/or establish communication links with cameras on the network are shown in block 720.

In some embodiments, the ARP discovery process 715 may be followed by a MAC address lookup at block 725, such as using a database of MAC address ranges associated with particular manufacturers and/or device models. For example, certain device manufacturers may publish MAC address ranges associated with particular devices, so with the MAC address of the device identified using an ARP request, the device model may be determined. In some embodiments, the provider of the video gateway device maintains its own mapping table of MAC addresses to device types. For example, the cloud site visibility system 230 (FIG. 2) may be in communication with multiple local site visibility systems 110, such as dozens, hundreds, thousands, or more local site visibility systems at different locations throughout a city, state, country, or worldwide. Thus, the cloud site visibility system 230 may obtain information regarding camera types and capabilities that are identified at one worksite, such as manually by a user setting up the cameras, that is useful to automatically identify the same camera type at other sites. For example, if a first worksite identifies a particular manufacturer/model of camera as having a specific MAC address, the MAC address lookup table may be updated to include that MAC address associated with the particular manufacturer/model (and/or other characteristics of the camera). Then, another worksite that identifies a camera having a MAC address similar to the specific MAC address identified by the first worksite (e.g., the same first three alphanumeric characters) may preliminarily determine that the camera is the same manufacturer/model, without user intervention.

In some embodiments, a MAC address mapping table may be stored at the cloud site visibility system (and/or at the local site visibility system), and include MAC address information for hundreds, thousands, or more cameras that have been obtained from hundreds, thousands, or more different sites. Thus, when a new MAC address is identified at a particular site, that MAC address may be looked up in the MAC address mapping table to identify the likely camera manufacturer, model, etc. The lookup may be based on a predefined portion of the MAC address, such as the first three digits of the MAC address of the camera matching the first three digits of a MAC address in the mapping table. In other embodiments, other matching (e.g., based on fewer, additional, and/or different digits of the MAC address and/or fuzzy matching) may be used identify the likely camera in the MAC address mapping table. In some embodiments, the MAC address mapping table may also include information directly obtained from manufacturers of cameras and/or other sources, in addition to information obtained through discovery and authentication of cameras at the multiple sites in communication with the cloud site visibility system.

Figure 8:
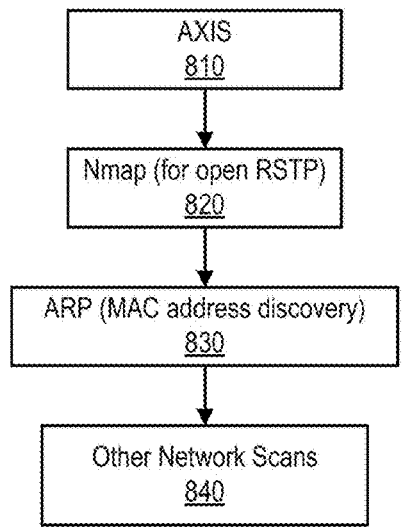
FIG. 8 is a flowchart illustrating one embodiment of an example order of performing device discovery using various communication protocols.

FIG. 8 illustrates, for example, an example order of performing device discovery using various communication protocols. In the embodiment of FIG. 8, the identification of any AXIS devices is performed initially at block 810, then an Nmap scan for open RSTP ports is performed at block 820, followed by an ARP request for MAC addresses at block 830, and then any other network scans 840 (e.g., ONVIF) may be performed. In some embodiments, after each device discovery process 810-840 is performed, if no additional potential cameras are on the network, the later network discovery processes may not be performed. For example, if after the Nmap scanning for RSTP ports is performed there are no remaining IP addresses identifiable on the network that could be cameras, the ARP scanning and other network scans may not be performed. In some embodiments, the network discovery processes may be performed in a different order than illustrated, and/or certain or all of the processes may be performed concurrently.

Returning to FIG. 7, at block 730, if a device is identified on the network using any of the processes 705-720 that may be a camera, the method continues to block 740. If, however, no additional possible cameras are identified on the network, the process continues to block 735 where the automated camera discovery process is completed. In some embodiments, information regarding the located cameras is then provided to a user, such as a site monitoring device 220 and/or a device local to the site visibility system 110. Additional cameras may then be identified manually by the user, if necessary, and information regarding those cameras may be provided to the cloud site visibility system for use by other local site visibility systems in the future.

At block 740, an automated authentication process is performed to identify credentials for communicating with the identified camera. Credentials may include a username and password and/or any other form of information that may be used to authenticate the video gateway device for communication with the located camera. In one embodiment, the automated authentication process 740 may include the example process of FIG. 9.

Figure 9:
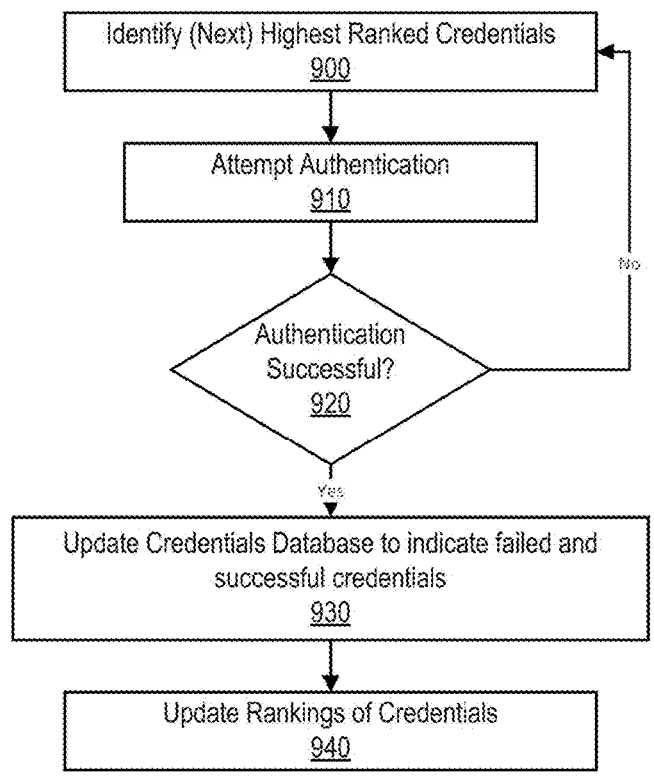
FIG. 9 is a flowchart illustrating one embodiment of an example method for identifying credentials for a camera and attempting authentication with those credentials.

FIG. 9 is a flowchart illustrating one embodiment of an example method for identifying credentials for a camera and attempting authentication with those credentials. In the embodiment of FIG. 9, the automated process is improved as credentials for various devices (e.g., combinations of manufacturer and model) are identified by the local site visibility system, as well as other site visibility systems that are in communication with the cloud site visibility system 230. In some embodiments, the smart credential selection process of FIG. 9 may be performed partially or fully by the cloud site visibility system 230. In some embodiments, the local site visibility system 110 performs the process of FIG. 9, based on a ranked listing of authentication credentials provided by the cloud site visibility system 230, for example. Depending on the embodiment, the process of FIG. 9 may include fewer or additional blocks and/or the blocks may be performed in an order different than is illustrated.

Beginning at block 900, the site visibility system identifies the highest ranked credentials, such as for the particular manufacturer and/or model of camera. For example, the site visibility system may query the cloud site visibility system with the particular manufacturer and/or model of an identified camera, and in return receive a ranked listing of credentials for that particular manufacturer and/or model of camera. In other embodiments, the local site visibility system 110 maintains a listing of some or all of the ranked credentials for certain cameras.

Next, at block 910, the highest ranked credentials are used to attempt to authenticate the video gateway device with the camera. For example, a username and password that has been successfully used to authenticate with the same manufacturer and model of camera previously by other site visibility systems may be at the top of the ranked listing.

At block 920, if authentication with the highest ranked credentials is not successful, the method returns to block 900, where the next highest credentials are selected and authentication is again attempted at block 910. If no further credentials remain for the particular manufacturer and/or model of camera, the automatic authentication process may end, and a request for a user to provide credentials for the camera may be provided, such as at block 755 of FIG. 7.

If authentication is successful at block 920, the method continues to block 930 where the authentication credentials database is updated to indicate any failed attempts and the successful authentication attempt. For example, information regarding credentials that were attempted, but were not successful in authenticating with the device, may be indicated as failed attempts, which may tend to reduce ranking of those authentication credentials for the particular camera manufacturer and/or model. Information regarding the failed and successful authentication attempts may be provided to the cloud site visibility system 230 for updating a master ranked authentication credentials listing for that particular manufacturer and model of camera.

At block 940, the rankings of credentials may be updated based on the information regarding failed and successful credentials provided at block 930. For example, if the highest ranked credentials were not successful in authenticating the device, the credentials that were successful in authenticating the device may be promoted to be the highest ranked for that particular camera, such that the successful credentials are attempted initially for future cameras of the same manufacturer and/or model. In this way, the site visibility system may maintain and dynamically update authentication credentials from multiple sites to improve the likelihood that automatic authentication of newly identified cameras is successful.

Returning to FIG. 7, once the automatic authentication has performed successful authentication with the located device (or a user has provided credentials at block 755 to authenticate with the device) at block 760, the method continues to block 765 where a still image from the camera is obtained. For example, the still image may be snapshot of the current video feed from the camera that is used in a thumbnail image associated with the camera. In some embodiments, a still image may not be obtained. In some embodiments, a video clip from the camera is obtained, such as a three second video stream that is played in the loop in a thumbnail for the camera. In some embodiments, the camera may include multiple lenses (e.g., a quad cam includes four cameras) and associated video feeds. In such an embodiment, at block 765 a still image from each of the lenses may be acquired.

Next, at block 770, capabilities of the camera may be obtained. For example, video streaming capabilities of the camera may be determined by querying the camera for such capabilities.

Figure 10:
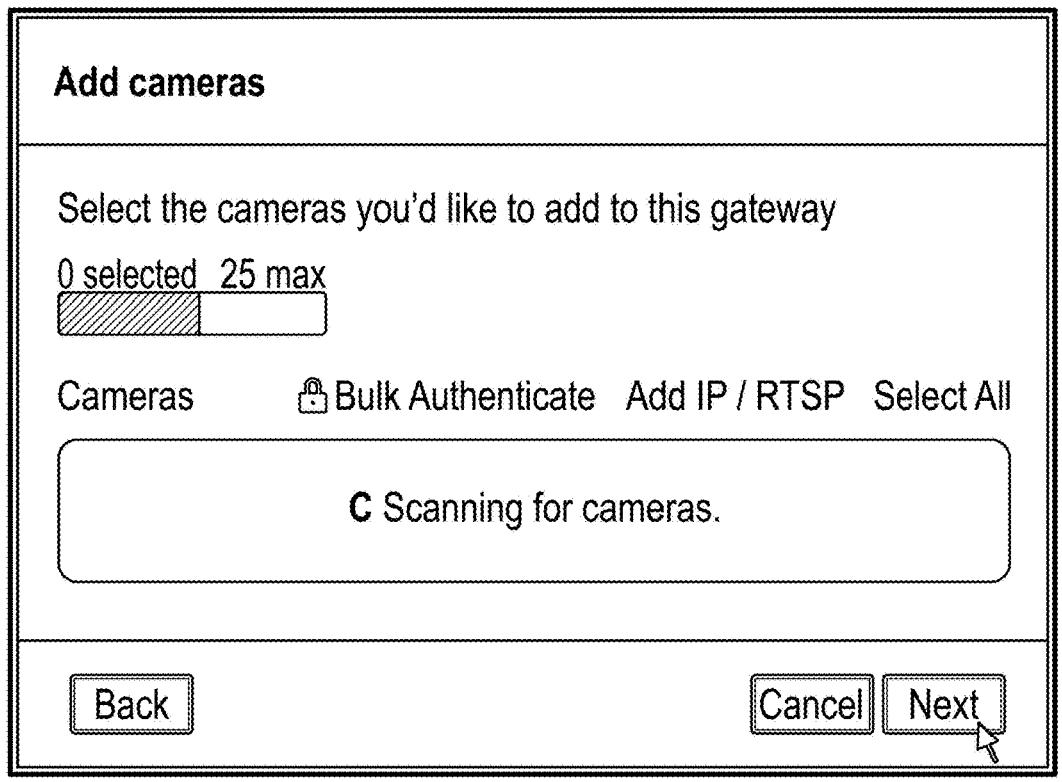
FIG. 10 is an example user interface that indicates a device discovery process has begun, such as when the process of FIG. 7 has started.
Figure 11:
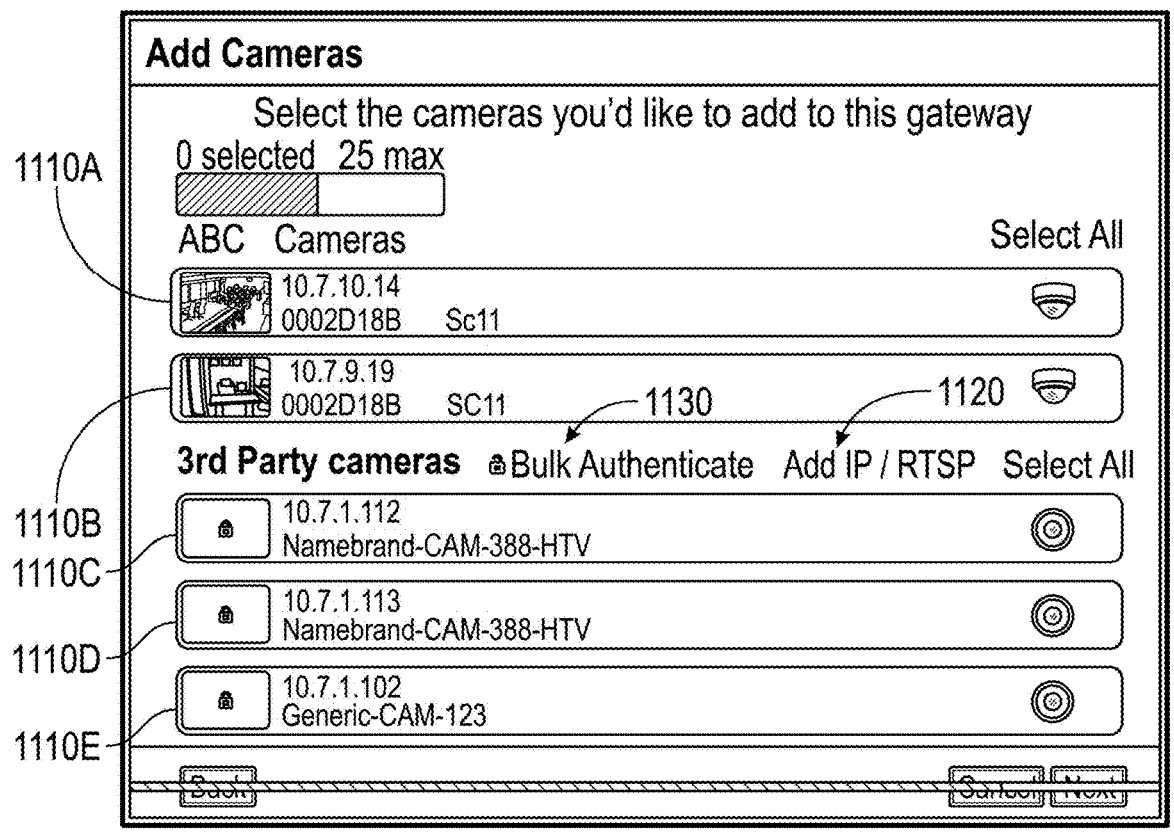
FIG. 11 is the example user interface of FIG. 10, updated to indicate cameras that have been identified on the network.

FIGS. 10-11 are example user interfaces that may be provided to a user device as part of a device discovery and registration process. For example, a device local to the site visibility system 110, such as a device in direct wired or wireless communication with the video gateway device, may be provided with similar user interfaces as part of the device discovery process. FIG. 10 illustrates, for example, a user interface that indicates a device discovery process has begun, such as when the process of FIG. 7 has started. FIG. 11 illustrates the same user interface, now updated with cameras that have been identified on the network. In this example, cameras 1110A and 1110B are cameras manufactured by the provider of the video gateway system, and so capabilities of those cameras are easily identifiable. The listed cameras also include cameras from a name brand manufacturer 1110C and 1110D, and a generic camera 1110E for which a manufacturer is not known. In this example, a bulk authenticate button 1130 may be selected to perform automated authentication of all of the identified cameras, such as by performing the process of FIG. 9. In some embodiments, the bulk authentication is an automated process that is performed as the cameras are located using the various communication protocols. The user may select an add IP/RTSP button 1120 to manually add information regarding a camera that may have not been detected by the automatic camera discovery processes.

Customized User Interfaces for Sensor Data

As discussed above, a site visibility system (e.g., a gateway device) may be in communication with a backend server. The site visibility system may receive sensor data from a plurality of sensors associated with a physical asset (e.g., a vehicle, equipment, etc.), an environment (e.g., a room, a building, a natural environment, etc.), etc. For example, the sensors may be dispersed throughout an environment (e.g., a building) to generate sensor data associated with particular features of the environment (e.g., different floors, different rooms, etc.). In another example, all or a portion of the sensors may be associated with physical assets such as vehicles (e.g., automobiles, trailers, refrigerated trailers, refrigerated vehicles (e.g., box trucks, etc.)), equipment (e.g., generators, sensors, motors, tools, physical apparatuses, etc.), or any other assets and a particular sensor may monitor a particular asset. It will be understood that while the disclosure may reference a vehicle, a trailer, a sensor, a motor, a room, a building, or any other particular asset, environment, etc., the sensors can generate sensor data associated with any asset, environment, etc.

Tracking and managing the environments and/or the physical assets deployed by and/or associated with a particular user can be important. Therefore, users may deploy a plurality of sensors for a given environment, fleet of physical assets, etc. For example, users can deploy sensors to monitor rooms of a building and/or vehicles, equipment, or any other physical assets in a fleet of physical assets. The sensors to monitor particular features of the physical asset and/or the environment such as global position system ("GPS") tracking, temperature tracking, component performance tracking, and the like. For example, the sensors may include image sensors (e.g., cameras), audio sensors, LIDAR sensors, RADAR sensors, etc. In some cases, the number of physical assets, environments, etc. being monitored and/or the number of sensors for monitoring can be large (e.g., 100 sensors).

As each physical asset and/or environment may include a plurality of sensors, tracking and managing the sensor data obtained from the plurality of sensors may be difficult. Further, processing the sensor data to identify particular sensor data to provide to the user via a computing device may be difficult given the amount of sensor data.

A user may utilize the sensor data to identify a user, a physical asset, an incident, or event. For example, a user may utilize the sensor data to identify the presence of a particular user within an environment. In some cases, a system may verify the occurrence of an incident or event and/or identify a source of the incident or vent by reviewing the sensor data. For example, the incident or event may be a security event (e.g., a breach of a secured environment by a third party), an abnormal event (e.g., a system failure), a maintenance event (e.g., performance of a maintenance event), etc. Further, the sensor data can be used to perform and/or schedule maintenance or other operations. For example, a sensor may indicate that an oil level of the physical asset is low and may be indicative of a need to change the oil. However, managing the sensor data, given the amount of sensor data, can be difficult and it can be difficult for users to review the sensor data.

Further, when a user attempts to access (e.g., download) particular data from a site visibility system and associated with one or more sensors, managing the access and efficiently providing access to the data can be difficult. For example, if a user is associated with a site visibility system associated with multiple sensors, identifying particular sensor data to enable access by the user may be difficult due to the amount of sensor data. As a result, systems may be unable to efficiently provide access to the sensor data.

In some cases, traditional systems may enable computing devices to directly download the sensor data from the site visibility system. For example, a user may utilize a computing device to download particular sensor data from a site visibility system associated with the user based on the occurrence of an event. However, this process may also be inefficient and unreliable as the connection between the computing device and the site visibility system may not support extended sensor data downloads. Further, such sensor data downloads may have a high failure rate (e.g., a 62% failure rate). For example, 62% of such sensor data downloads may fail to download the sensor data from the site visibility system to the computing device.

In some cases, traditional systems may utilize synchronous calls to access the sensor data from the site visibility system. For example, a computing device may implement a synchronous call such that code execution may be paused by the computing device until a response to the synchronous call is received. However, this process may also be inefficient and expensive as the computing device may not receive a response to the synchronous call within a particular time period.

Additionally, due to the time consuming and inefficient process to obtain sensor data generated by the plurality of sensors, it can be time consuming and inefficient to identify particular sensor data. Specifically, each physical asset and/or environment may be associated with separate sensor data and traditional systems may not be able to identify particular relevant sensor data. Therefore, just processing the sensor data by traditional systems can be an issue.

As mentioned above, according to various embodiments of the present disclosure, an improved system can include site visibility systems that route sensor data to the system (e.g., a backend server such as the management server system). Each site visibility system may be attached (e.g., via a wireless or wired connection) to one or more sensors. The site visibility system can obtain sensor data generated by the one or more sensors. The one or more sensors may generate sensor data associated with a particular physical asset, environment, etc. For example, the one or more sensors may include image sensors that generate image data associated with a particular environment (e.g., a building, a room, a hallway, a door, an exit, etc.). In another example, the one or more sensors may include an audio sensor, a temperature sensor, a lock sensor, a humidity sensor, a cargo monitor sensor, a latch sensor, a door monitor sensor, or any component monitoring sensor to monitor a physical asset, environment, etc.

Each of the plurality of sensors may transmit sensor data to the site visibility system. The plurality of sensors may transmit the sensor data to the site visibility system via a first network. For example, the plurality of sensors may transmit the sensor data to the site visibility system via a local area network or a personal area network. In some cases, the plurality of sensors may transmit the sensor data to the site visibility system via a Bluetooth connection. Each of a plurality of site visibility systems can transmit obtained sensor data to a management server system. In some embodiments, the site visibility system and/or the management server system may implement a machine learning model trained to identify the occurrence of a particular feature within received sensor data and/or to identify an event based on the occurrence of the particular feature. The management server system may receive sensor data from a plurality of site visibility systems. For example, the management server system may receive sensor data from one or more site visibility systems associated with a first environment, one or more site visibility systems associated with a second environment, etc. Therefore, the management server system may receive a large amount of data (e.g., in real time) at a high frequency from the plurality of site visibility systems.

To enable an improved data download and/or access process, the management server system can cause display of a first user interface that may identify one or more sets of image data, one or more image sensors, one or more site visibility systems, etc. The first user interface may include a visualization for all or a portion of the sets of image data, the image sensors, the site visibility systems, etc. All or a portion of the visualizations may include a preview of the image data. For example, a visualization may include a preview of image data associated with a particular site visibility system. In some cases, the visualization may include a preview of real time image data being streamed from the site visibility system.

The visualization may include a separate element and/or the visualization may be interactive such that the user can interact with the visualization to request the corresponding data to be download. In some cases, the user can interact with the visualization to request access to streaming data from the site visibility system. Based on the interaction by the user, the computing device can generate an input and provide the input to the management server system. The management server system can receive the input. For example, the user may indicate that the corresponding data should be downloaded and/or streamed.

Based on obtaining the input, the management server system can define a storage destination for the image data. For example, the management server system can define a storage destination (e.g., identify a data store) for the image data. The storage destination may include an identifier for a data store for the image data. In some cases, the storage destination may be a data store, a database, a cache, virtual storage, etc.

The management server system can communicate the storage destination to the site visibility system associated with the input. The management server system may identify the site visibility system based on the input. For example, the management server system may determine that the user associated with the input is requesting image data associated with a particular site visibility system or a sensor associated with a particular site visibility system. For example, the user may request data associated with a particular physical asset, a particular environment, a particular sensor, a particular site visibility system, etc. and identify a corresponding site visibility system and communicate the storage destination to the site visibility system.

As discussed above, the management server system can initiate upload of the data from the site visibility system to the storage destination. For example, the site visibility system can utilize the storage information provided by the management server system to store the data at the storage destination.

In some cases, based on the input, the management server system can cause the data to be streamed from the storage destination and/or the site visibility system to the computing device (or a separate computing device). In some cases, the management server system can cause the data to be simultaneously and/or in parallel uploaded to the storage destination and streamed to the computing device.

As the site visibility system uploads the data to the storage destination and/or after the site visibility system uploads the data, the management server system may monitor the status of the upload. For example, the management server system can send one or more queries to the storage destination and/or the site visibility system to determine a status of the upload. Further, based on responses to the queries, the management server system can identify whether the upload is complete or incomplete. In some cases, the management server system can identify an amount of the upload that is complete.

Based on receiving the information identifying the status of the upload, the management server system can route the information to the computing device. Further, the management server system can utilize the information to generate and display visualizations (e.g., toasts) indicating a status of the upload of the data. The visualization may indicate a status of the upload process, a status of a particular site visibility system, a status of a particular sensor, etc.

The management server system can, based on the queries, determine that the data has been uploaded from the site visibility system to the storage destination. Further, the management server system can generate a visualization of the uploaded data and cause display of the visualization via a second user interface. The visualization may indicate that the data has been successfully uploaded to the storage destination. In some cases, a user may interact with the visualization, via a computing device to download the data from the storage destination. For example, in response to user input, the computing device may initiate a download process to directly download the data from the storage destination without the computing device downloading the data from the site visibility system (e.g., without a connection between the computing device and the site visibility system).

The management server system can monitor data uploaded from site visibility systems to storage destinations. For example, the management server system may track the data uploads via upload information stored by the management server system. In some cases, the management server system can utilize the upload information to identify whether or not to initiate an upload process from a site visibility system to a storage destination based on a user input. If the upload information indicates that particular data was previously uploaded from the site visibility system to the storage destination, the management server system may respond to the input without causing the data to be reuploaded. If the upload information indicates that particular data was not previously uploaded from the site visibility system to the storage destination, the management server system may cause the data to be uploaded.

Example User Interfaces for Data Download

FIGS. 12, 13, 14, 15, and 16 illustrate example interactive graphical user interfaces related to downloading data via a site visibility system, according to various embodiments of the present disclosure. The interactive graphical user interfaces of FIGS. 12, 13, 14, 15, and 16 may be provided by a management server system, and may be accessible via user device(s). In general, the management server system may obtain a request for particular sensor data and may identify a storage destination for a computing device to access the sensor data to provide information and insights as described herein. In some embodiments, the graphical user interfaces provided by the management server system may be specific to an organization, and may include information from multiple site visibility systems associated with the organization. It will be understood that while the graphical user interfaces of FIGS. 12, 13, 14, 15, and 16 reference an implementation with respect to a particular site visibility system and a particular environment, the graphical user interfaces may be implemented with respected to any physical asset, environment, etc. and any number of site visibility systems.

Figure 12:
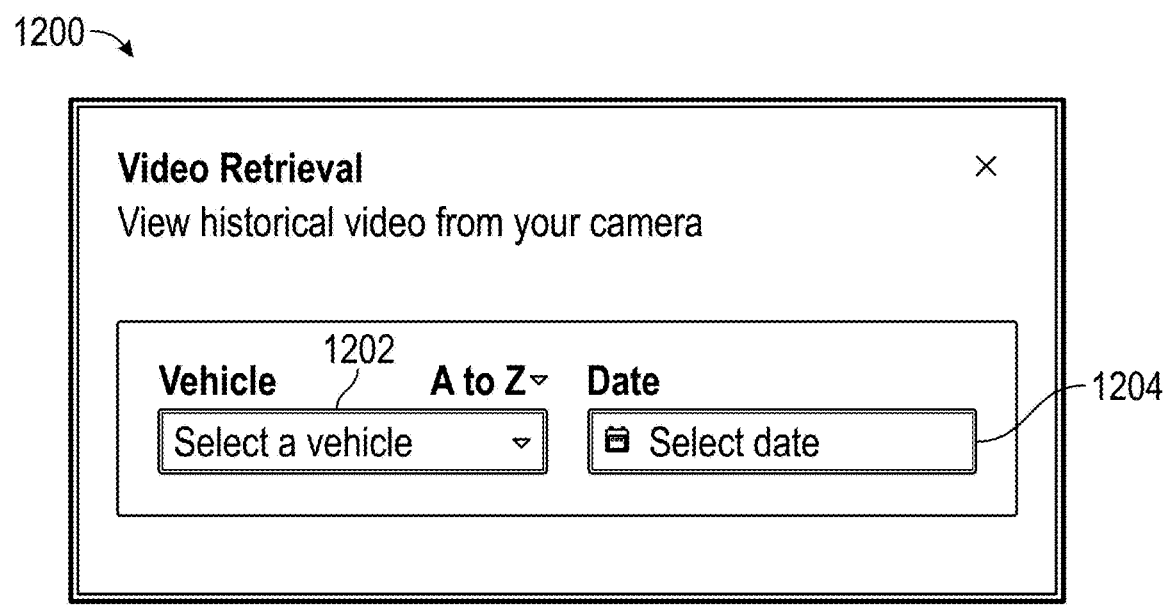
FIG. 12 is an example user interface for the initiation of a data download process.

FIG. 12 illustrates an example interactive graphical user interface 1200 for providing visualizations sensor data. The example interface 1200 is illustrative of an improved, customized interface that the management server system generates and presents to a user via a user computing device. For example, the management server system may generate and present the example interface 1200 to a user based on the user registering, via the user computing device, one or more site visibility systems.

In the example of FIG. 12, the example interface 1200 includes a visualization that enables a user to select one or more subsets of sensor data. The visualization may include a representation of all or a portion of the site visibility systems, the sensors, the environments, the physical assets (e.g., vehicles), etc. associated with a particular user and/or organization. To generate the visualization, the management server system may identify the site visibility systems, the sensors, the environments, the physical assets (e.g., vehicles), etc. associated with the particular user and/or organization. In some cases, the management server system may identify the site visibility systems, the sensors, the environments, the physical assets (e.g., vehicles), etc. that are active (e.g., online, connected to a network, etc.).

The example interface 1200 may include a first data selection area 1202 and a second data selection area 1204. All or a portion of the first data selection area 1202 and the second data selection area 1204 may correspond to a drop-down menu, a search bar, or an interactive parameter. Further, the first data selection area 1202 and the second data selection area 1204 may enable a user, via a user computing device, to define data to be uploaded to be a particular storage destination.

The first data selection area 1202 may enable the user to select a particular physical asset, environment, site visibility system, sensor, etc. For example, the first data selection area 1202 may enable the user to select a physical asset, environment, site visibility system, sensor, etc. from a plurality of physical assets, environments, site visibility systems, sensors, etc. associated with the user, the organization, etc. In some embodiments, the first data selection area 1202 may enable the user to define a customized subset of the data. For example, the first data selection area 1202 to identify customized subset of the data associated with one or more physical assets, environments, site visibility systems, sensors, etc.

The second data selection area 1204 may enable the user to select a particular time range associated with the data. For example, the second data selection area 1204 may enable the user to select a particular date or range of dates, a particular time period, etc. In some embodiments, the second data selection area 1204 may be populated based on the options from the first data selection area 1202 and/or based on a selection via the first data selection area 1202. For example, if a user selects a particular environment using the first data selection area 1202, the second data selection area 1204 may be populated with a list of options based on the selection of the particular environment. Specifically, the second data selection area 1204 may be populated with a particular date or range of dates, a particular time period, etc. corresponding to the selected particular environment (e.g., a particular date or range of dates, a particular time period, etc. for which the selected particular environment has been monitored by a sensor, for which site visibility system has access to data associated with the environment, etc.).

In some cases, the example user interface 1200 may include a plurality of visualizations. All or a portion of the visualizations may include a virtual representation of a particular environment, a particular physical asset, a particular site visibility system, a particular sensor, etc. In some cases, all or a portion of the visualizations may include a virtual representation of the sensor data associated with a particular environment, a particular physical asset, a particular site visibility system, a particular sensor, etc. Further, all or a portion of the visualizations may include at least a portion of the associated sensor data. For example, all or a portion of the visualizations may include at least a portion of the historical sensor data associated with a particular environment, a particular physical asset, a particular site visibility system, a particular sensor, etc. In some cases, all or a portion of the visualizations may include streaming sensor data associated with a particular environment, a particular physical asset, a particular site visibility system, a particular sensor, etc. Specifically, the example user interface 1200 may include streaming or historical image data and may provide the streaming or historical image data to a user.

In the example of FIG. 12, the first data selection area 1202 enables a user to select data from a particular vehicle to be uploaded to a storage destination. For example, the first data selection area 1202 may include an interactive parameter that defines vehicles associated with a particular user and/or organization. The user may interact with the first data selection area 1202 to define the data to be uploaded to the storage destination (e.g., data associated with Vehicle #1231242). For example, the first data selection area 1202 may display data associated with a vehicle (e.g., footage) and enable a user to select particular data. Further, the second data selection area 1204 enables a user to select a date and/or range of dates for the data to be uploaded to the storage destination. For example, the second data selection area 1204 may include an interactive parameter that defines one or more dates (e.g., one or more dates for which the site visibility system has access to data associated with the vehicle). The user may interact with the second data selection area 1204 to further define the data to be uploaded to the storage destination (e.g., real-time streaming data, data associated with a particular date range, etc.). In some embodiments, one or more parameters and/or areas in the example interface may be selectable and can cause presentation of an upload interface, such as the graphical user interface 1300 described below with respect to FIG. 13, the graphical user interface 1400 described below with respect to FIG. 14, and/or the graphical user interface 1500 described below with respect to FIG. 15.

Figure 13:
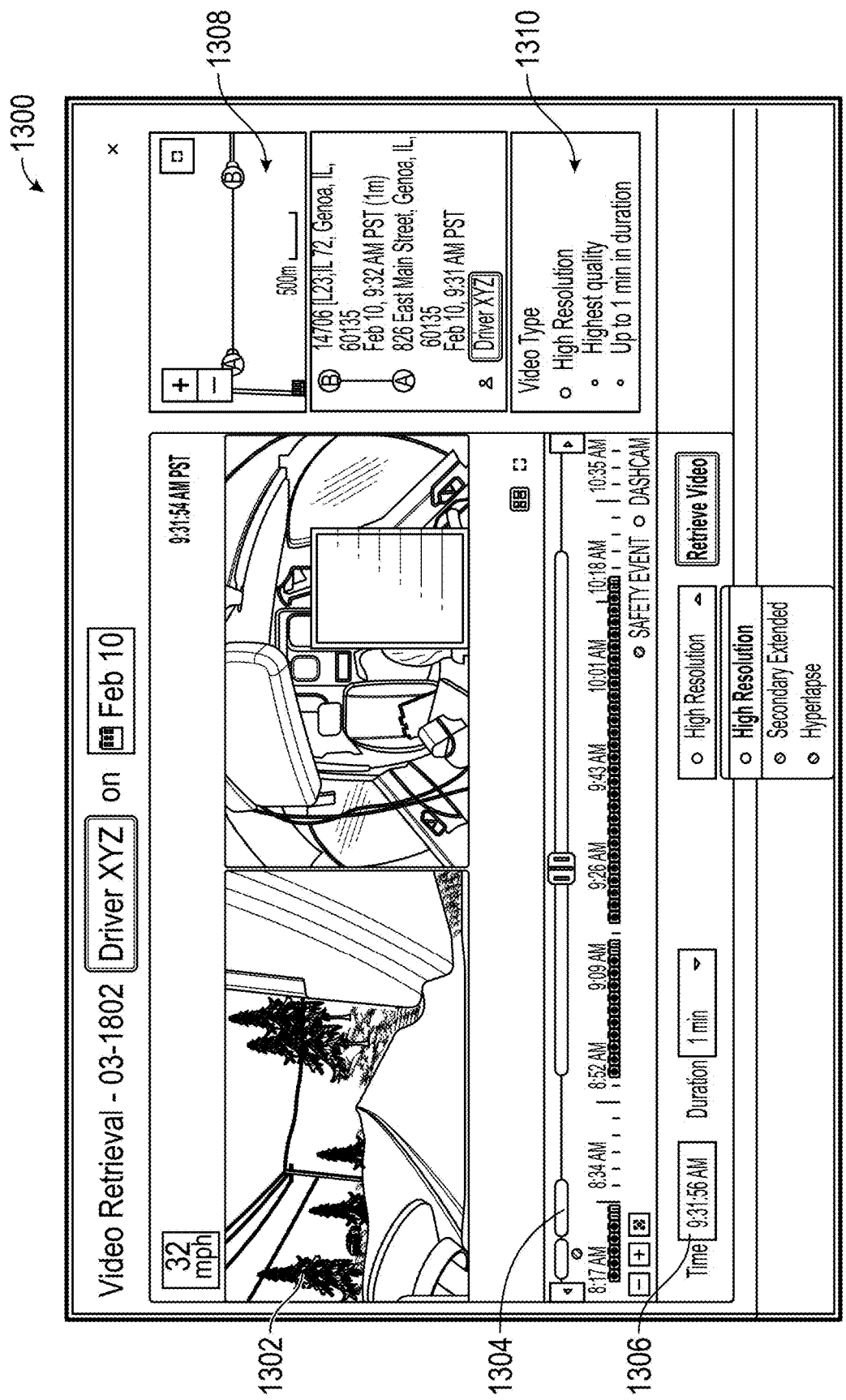
FIG. 13 is an example user interface to define a data download request.

FIG. 13 illustrates an example interactive graphical user interface 1300 for providing an additional visualization of data to be uploaded to a storage destination for confirmation. The example interface 1300 is illustrative of an improved, customized interface that the management server system generates and presents to a user via a user computing device. As discussed above, the management server system may generate and present the example interface 1300 to a user based on the user interacting with a particular visualization to request particular data to be uploaded to a storage destination.

In the example of FIG. 13, the example interface 1300 includes a visualization that identifies a subset of data associated with a user request to upload data from a site visibility system to a storage destination. The visualization may include a representation of at least a portion of the data. For example, the visualization may include an image (e.g., a still image), a video clip, etc. from image data. Further, the visualization may include identifying information associated with the sensor data. For example, the visualization may include identifying information that identifies a time range associated with the requested data, a location associated with the requested data, at type of the requested data, a user associated with the requested data, etc.

The example interface 1300 may include a first area 1302, a second area 1304, a third area 1306, a fourth area 1308, and a fifth area 1310. All or a portion of the first area 1302, the second area 1304, the third area 1306, the fourth area 1308, and/or the fifth area 1310 may correspond to a drop-down menu, a search bar, or an interactive parameter. Further, all or a portion of the first area 1302, the second area 1304, the third area 1306, the fourth area 1308, and/or the fifth area 1310 may enable a user, via a user computing device, to further define data (e.g., data previously defined using the example interface 1200) to be uploaded to be a particular storage destination. All or a portion of the first area 1302, the second area 1304, the third area 1306, the fourth area 1308, and/or the fifth area 1310 may identify the data to be uploaded from the site visibility system to the storage destination.

The first area 1302 may include a visualization of the data. For example, the first area 1302 may include a visual representation, graphical representation, linear representation, etc. of at least a subset of the data defined to be uploaded from the site visibility system to the storage destination. Further, the first area 1302 may include a representation of image data, temperature data, audio data, location data, etc. Specifically, the first area 1302 may include a display of a portion of image data (e.g., a clip, an image, etc.).

The second area 1304 may include a visualization of a time period and/or date range associated with the data (e.g., selected via the example interface 1200). For example, the second area 1304 may include a timeline enabling a section of a particular time period. Further, the second area 1304 may be interactive such that a user can interact with the visualization of the time period and/or date range to further define a time period and/or date range for data to be uploaded from the site visibility system to the storage destination.

The third area 1306 may include a visualization of a time period and/or date range associated with the data. In some cases, the second area 1304 may correspond to a first manner of defining a subset of the time period and/or date range and the third area 1306 may correspond to a second manner of defining a subset of the time period and/or data range. For example, the second area 1304 may include a slidable timeline visualization and the third area 1306 may include an interactive drop-down menu. In some cases, the third area 1306 may include an interactive visualization that enables a user to select a particular resolution of the video (e.g., high resolution, secondary extended resolution, hyperlapse, etc.).

The fourth area 1308 may include a visualization of location data associated with the data. The location data may identify a location of the environment, physical asset, site visibility system, sensor, etc. associated with the date. For example, the data may be sensor data from an image sensor that is monitoring a particular environment (e.g., a building) and the location data may identify a location of the environment, the image sensor, a corresponding site visibility system, etc. In some cases, the fourth area 1308 may include a visual representation of the location data (e.g., a representation on a map of the location data) and/or a textual representation of the location data (e.g., an address). Further, the fourth area 1308 may indicate a user associated with the data. For example, the fourth area 1308 may indicate a driver, a manager, an operator, etc. associated with the environment, physical asset, site visibility system, sensor, etc. to which the sensor data corresponds.

The fifth area 1310 may include a summary of the data to be uploaded from the site visibility system to the storage destination. For example, the fifth area 1310 may define the resolution, quality, duration, time period, date range, etc. of the data to be uploaded from the site visibility system to the storage destination.

In the example of FIG. 13, the first area 1302 includes a visual representation of a portion of the data. Specifically, the first area 1302 includes a visual representation of a portion of sensor data associated with a first sensor (e.g., an inward facing image sensor) and a visual representation of a portion of sensor data associated with a second sensor (e.g., an outward facing image sensor). The second area 1304 includes an interactive timeline visualization of the data. The second area 1304 may identify a particular time period (e.g., as defined via the interface 1200) and identify data over the time period. For example, the second area 1304 may identify a portion of the time period for which corresponding sensor data was generated and/or a portion of the time period for which corresponding sensor data was not generated. The third area 1306 includes one or more drop down menus to further define the time period. Specifically, the third area 1306 includes a first drop down menu to define a subset of the time period (e.g., a time) and a second drop down menu to define a time duration (e.g., from the subset of the time period defined via the first drop down menu). In the example of FIG. 13, the third area 1306 defines the time period as "9:31:56 AM," the duration as "1 min," and the resolution as "high resolution." The fourth area 1308 includes a graphical and textual representation of the location data of the environment and/or physical asset being monitored. Specifically, the fourth area 1308 includes a visual representation of the location as it changes over the time period (e.g., a route) and a textual representation of the source, destination, and user associated with the environment and/or physical asset. In the example of FIG. 13, the fourth area defines the source as "14706 IL 23, IL 72, Genoa, IL 60135" with an associated time and date of "February 10, 9:32 AM PST (1m)," the destination as "826 East Main Street, Genoa, IL 60135" with an associated time and date of "February 10, 9:31 AM PST," and a user as "Driver XYZ." The fifth area 1310 includes a representation of the data to be uploaded from the site visibility system to the storage destination. Specifically, the fifth area 1310 defines the resolution as "high resolution," the quality as "highest quality," and the duration as "up to 1 min in duration."

Figure 14:
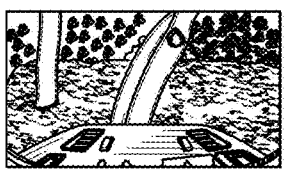
FIG. 14 is an example user interface to provide a data download request.
Figure 14:
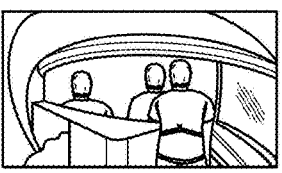

FIG. 14 illustrates an example interactive graphical user interface 1400 for providing confirmation of the data to be uploaded from the site visibility system to a storage destination. The example interface 1400 is illustrative of an improved, customized interface that the management server system generates and presents to a user via a user computing device. As discussed above, the management server system may generate and present the example interface 1400 to a user based on the user interacting with a particular visualization of the sensor data (e.g., via the interface 1200). In some embodiments, the management server system may provide the example interface based on a user interaction with an element of an interface (e.g., an element of example interface 1200 of FIG. 12) or as a continuation of an interface (e.g., a continuation of example interface 1300 of FIG. 13).

In the example of FIG. 14, the example interface 1400 includes a visualization of sensor data to be uploaded from the site visibility system to a storage destination. The example interface 1400 further includes a visualization identifying characteristics and/or a summary of the data to be uploaded from the site visibility system to the storage destination. To identify the sensor data to be uploaded, the management server system may receive one or more inputs from a user computing device via one or more user interfaces (e.g., interfaces 1200, 1300). The example interface 1400 may include a data summary area 1402 and a confirmation/cancelation element 1404.

The example interface 1400 may identify data to be uploaded from the site visibility system to the storage destination. As discussed above, the example interface 1400 may define a subset of sensor data obtained by the site visibility system from one or more sensors to be uploaded from the site visibility system to a storage destination for access by a user computing device. In some cases, the subset of sensor data may include historical data and/or real-time streaming data.

The data summary area 1402 may include a summary of the data to be uploaded from the site visibility system to the storage destination. For example, the data summary area 1402 may define the resolution, quality, duration, time period, date range, etc. of the data to be uploaded from the site visibility system to the storage destination. In some cases, the data summary area 1402 may include a visualization of the data to be uploaded (e.g., a subset of the data, historical data associated with the same or a different sensor, site visibility system, physical asset, environment, etc.). The data summary area 1402 may be populated based on input received via the interfaces 1200 and/or 1300. The data summary area 1402 can define a date range and/or time period for the data identifying when the data was historically captured and/or generated, when the data will be captured and/or generated on, and/or date range and/or time period associated with the data. In the example of FIG. 14, the data summary area 1402 defines the date range and time period as "Jan. 17, 2022 2:41 PM," a duration of the data as "1 min," and a resolution of the data as "High Resolution." Further, the data summary area 1402 includes a virtual representation of the data (e.g., one or more images.

The confirmation/cancelation element 1404 may include one or more elements to confirm and/or cancel the upload of the defined data from the site visibility system to the storage destination. In the example of FIG. 14, the confirmation/cancelation element 1404 includes a first element to confirm and/or initiate the upload of the data and a second element to cancel and/or delay initiation of the upload of the data.

Figure 15:
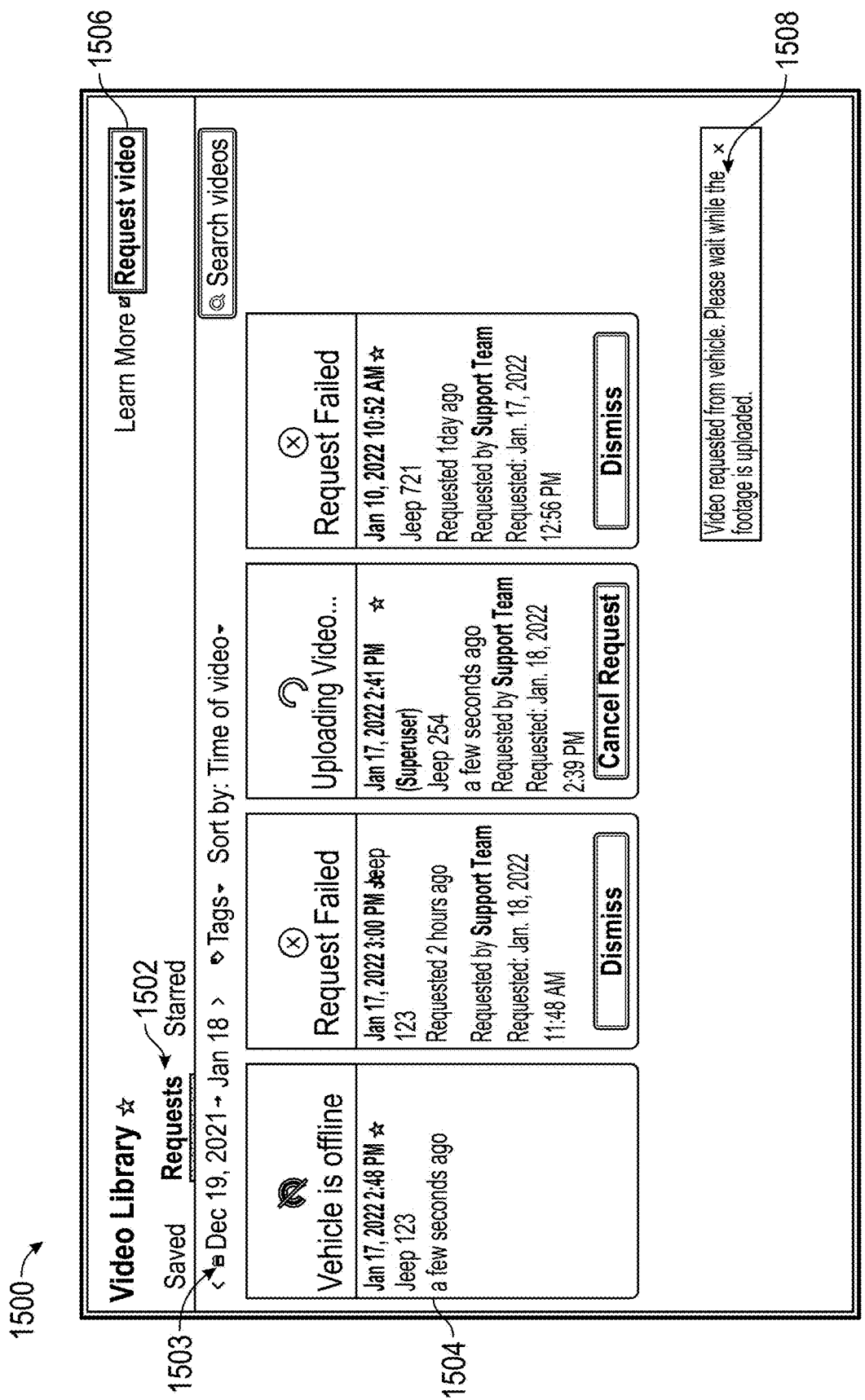
FIG. 15 is an example user interface identifying a status for each of a set of data download requests.

FIG. 15 illustrates an example interactive graphical user interface 1500 for providing visualizations of all or a portion of the data uploaded and/or to be uploaded from the site visibility system to the storage destination(s). The example interface 1500 is illustrative of an improved, customized interface that the management server system generates and presents to a user via a user computing device. For example, the management server system may generate and present the example interface 1500 to a user based on the user requesting data to be uploaded from the site visibility system to a storage destination.

The example interface 1500 may include a saved data area, a requested data area, and a starred data area. All or a portion of the saved data area, the requested data area, and the starred data area may identify particular data. For example, the saved data area may identify data uploaded from the site visibility system to the storage destination. In some cases, the saved data area may identify data uploaded from the site visibility system to the storage destination and downloaded from the storage destination to the user computing device. The requested data area may identify one or more requests (e.g., pending requests, completed requests, canceled requests, etc.) by the user to upload data from the site visibility system to the storage destination. In some cases, the requested data area may identify one or more requests by the user to download data from the storage destination to the user computing device. The starred data area may identify starred, filtered, parsed, etc. data (e.g., starred data uploaded from the site visibility system to the storage destination).

Though not depicted in FIG. 15, all or a portion of the saved data area, the requested data area, and/or the starred data area of the example interface 1500 may include a visualization of the data. For example, the saved data area may include a plurality of visualization of data uploaded from the site visibility system to the storage destination.

The interface 1500 may include a first area 1502, a second area 1503, a third area 1504, a fourth area 1506, and a fifth area 1508. The first area 1502 may include one or more interactive elements. The interactive elements may enable a user to select one or more of the saved data area, the requested data area, and/or the starred data area for display. While the second area 1503, the third area 1504, the fourth area 1506, and the fifth area 1508 are depicted with respect to the requested data area (e.g., based on a selection received via the first area 1502), one or more of the second area 1503, the third area 1504, the fourth area 1506, and/or the fifth area 1508 (or similar areas) may be depicted with respect to the saved data area and/or the starred data area.

The second area 1503 may include one or more interactive elements (e.g., a drop down menu, a search bar, etc.). The second area 1503 may enable a user to define a filter for and/or a manner of sorting a subset of data for display via the saved data area, the requested data area, and/or the starred data area. For example, the second area 1503 may enable a user to define a time period (e.g., of the requests for the data, generation of the data by the sensor, receipt of the data by a site visibility system, etc.), a, a particular environment, physical asset, site visibility system, or sensor, a tag, and/or a manner of sorting for the data to be provided via the interface 1500. The second area 1503 may include a search bar to enable users to provide queries that the management server system can execute to filter the data.

The third area 1504 may include one or more visualization of subsets of data. For example, the one or more visualizations of the subsets of the data may include pictorial representations (e.g., clips, images, etc.) for particular subsets of the data. Each subset of data may be associated with the same or different vehicles, fleets of vehicles, gateway devices, management server systems, etc. The third area 1504 may include visualization of subsets of data requested by a particular user (e.g., associated with vehicles linked to the user). For example, the third area 1504 may include visualizations of subsets of data associated with the same vehicle and/or visualizations of subsets of data associated with different vehicles. The third area 1504 may be populated with data based on one or more inputs received via the second area 1503. For all or a portion of the subsets of the data, the third area 1504 may define a physical asset, environment, site visibility system, or sensor, a status of the data (e.g., uploaded to the storage destination, downloaded to the user computing device, uploading and/or downloading, request failed, device (e.g., the site visibility system, physical asset, sensor, etc.) is unavailable (e.g., offline), etc.), a requesting user, a date and/or time period of the request, etc.

The fourth area 1506 may include one or more interactive elements to enable a user to request particular data to be uploaded to the storage destination from the site visibility system, to be downloaded to the user computing device from the storage destination, and/or to be streamed to the user computing device. Based on requesting particular data, the fifth area 1508 may include a response to the prompt requesting particular data. For example, the fifth area 1508 may include a visualization indicating that the data is being downloaded and/or uploaded, an amount (e.g., a percentage) of the data that has been downloaded and/or uploaded, and/or completion or cancelation of the download and/or upload.

In the example of FIG. 15, the first area 1502 indicates that the requested data area has been selected for display (e.g., via a user interaction with the interface 1500). The second area 1503 indicates a selected date range as "Dec. 19, 2021-Jan. 16," no selected tags, a manner of sorting as "Sort by: Time of video," and no implemented queries. The parameters selected via the second area 1503 may be used to filter the data presented by the third area 1504. The third area 1504 includes visualizations of data requests based on the parameters. Specifically, the third area 1504 includes a first visualization indicating that the data was requested "a few seconds ago," the data corresponds to "Jeep 123," the data was generated "Jan. 17, 2022 2:48 PM," and a status as "the vehicle is offline," a second visualization indicating that the data was requested by "Support Team" on "Jan. 18, 2022 11:48 AM" or "2 hours ago," the data corresponds to "Jeep 123," the data was generated "Jan. 17, 2022 3:00 PM," and a status as the "request failed," a third visualization indicating that the data was requested by "Support Team" on "Jan. 18, 2022 2:39 PM" or "a few seconds ago," the data corresponds to "Jeep 254," the data was generated "Jan. 17, 2022 2:41 PM" for a "Superuser," and a status as "uploading video," and a fourth visualization indicating that the data was requested by "Support Team" on "Jan. 17, 2022 12:56 PM" or "1 day ago," the data corresponds to "Jeep 721," the data was generated "Jan. 10, 2022 10:52 AM," and a status as the "request failed." The fourth area 1506 includes an interactive element to enable a user to request particular video. The fifth area 1508 indicates a status of a particular video upload and/or download as "Video requested from vehicle. Please wait while the footage is uploaded."

Figure 16:
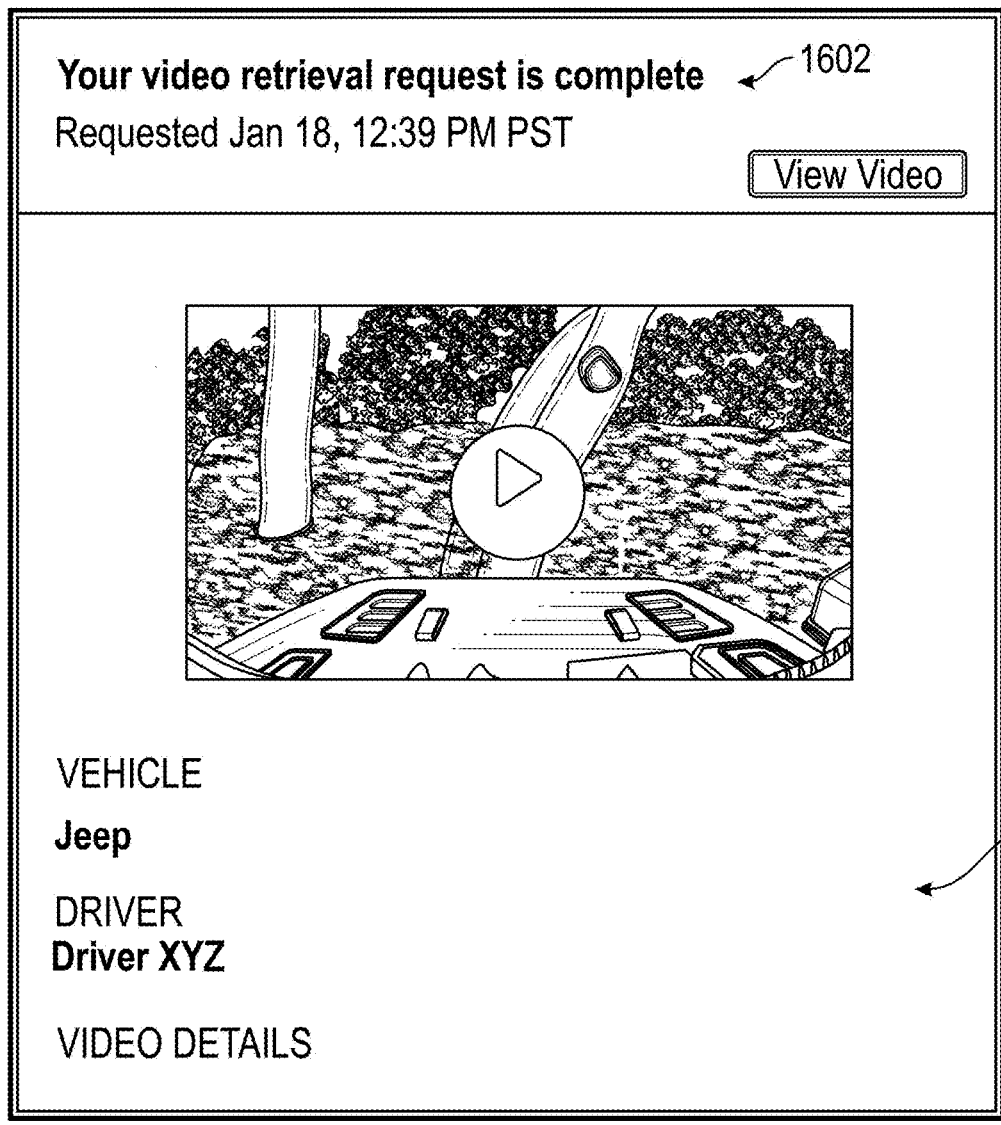
FIG. 16 is an example user interface indicating a data download request has been completed.

FIG. 16 illustrates an example interactive graphical user interface 1600 for providing confirmation that requested data has been uploaded from a site visibility system to a storage destination and/or downloaded from the storage destination to a user computing device. The example interface 1600 is illustrative of an improved, customized interface that the management server system generates and presents to a user via a user computing device. In some cases, the example interface 1600 may be displayed as part of a message (e.g., an email message, a text message, etc.) sent to the user computing device. As discussed above, the management server system may generate and present the example interface 1500 to a user based on the user interacting with a particular interface to request particular data to be uploaded and/or downloaded.

In the example of FIG. 16, the example interface 1600 includes a visualization of data uploaded from the site visibility system to a storage destination and/or downloaded from the storage destination to the user computing device. The example interface 1600 further includes a visualization identifying characteristics and/or a summary of the data uploaded from the site visibility system to a storage destination and/or downloaded from the storage destination to the user computing device. The example interface 1600 may include a status area 1602 and a data summary area 1604.

The example interface 1400 may identify uploaded from the site visibility system to a storage destination and/or downloaded from the storage destination to the user computing device. For example, the management server system may monitor data to be uploaded from the site visibility system to a storage destination and/or downloaded from the storage destination to the user computing device. The management server system may monitor the data by tracking communications between the site visibility system and the storage destination and/or the storage destination and the user computing device. Further, the management server system may monitor the data by querying one or more of the site visibility system, the storage destination, and/or the user computing device to determine if the data has been uploaded and/or downloaded. Based on identifying that the data has been uploaded and/or downloaded (e.g., successfully), the management server system can cause display of the interface 1600.

The status area 1602 may indicate a status of the upload and/or download. For example, the status may be a complete status, incomplete status, partially complete status, cancelled status, or any other status. The status area 1602 may further indicate when the data was requested. The status area 1602 may include an interactive element to view the data (e.g., to cause display of the data). In the example of FIG. 16, the status area 1602 indicates the data was "Requested January 17, 12:39 PM PST" and the status as "Your video retrieval request is complete."

Figure 17:
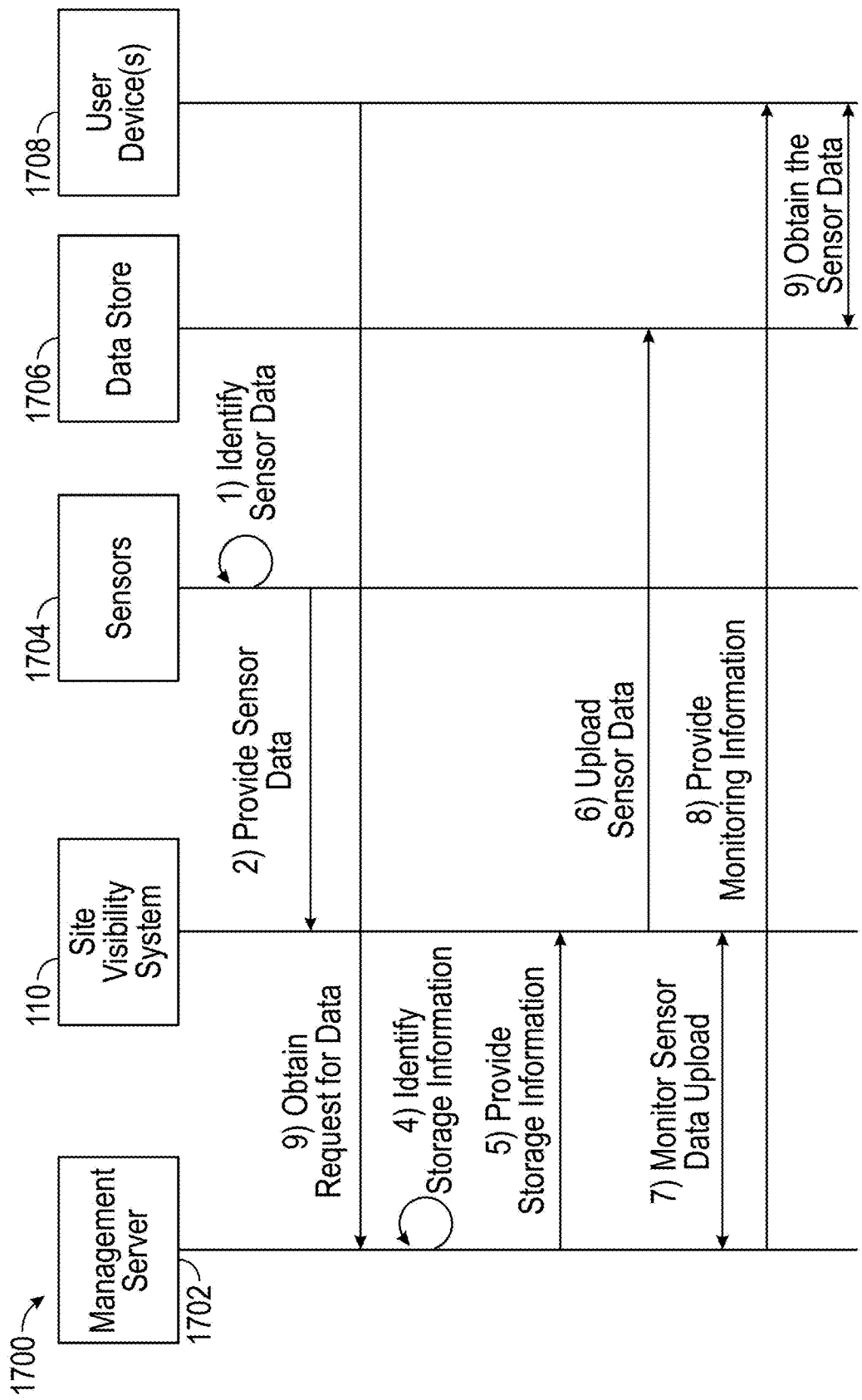
FIG. 17 is a flowchart illustrating one embodiment of an example data download process from a gateway device.

The data summary area 1604 may include a summary of the data uploaded from the site visibility system to a storage destination and/or downloaded from the storage destination to the user computing device. For example, the data summary area 1604 may define the resolution, quality, duration, time period, date range, site visibility system, sensor, environment, physical asset, a user, etc. of the data uploaded from the site visibility system to a storage destination and/or downloaded from the storage destination to the user computing device. In some cases, the data summary area 1604 may include a visualization of the data uploaded from the site visibility system to a storage destination and/or downloaded from the storage destination to the user computing device. In the example of FIG. 16, the data summary area 1604 defines the physical asset as "Vehicle: Jeep" and the user as "Driver XYZ Example Embodiments of Providing Access to Sensor Data FIG. 17 depicts interactions among various components for providing access to particular data in accordance with aspects of the present disclosure. The environment 1700 may include various components implemented in a networked configuration. The environment 1700 may include a management server system 1702, a site visibility system (e.g., site visibility system(s)) 110, sensor(s) 1704, data store 1706, and user device(s) 1708. The management server system 1702 may include a system for managing access to sensor data generated by the sensor(s) 1704. The data store 1706 may include a cache, a data store, a database, virtual storage, etc. for storing the sensor data for access by the user device(s) 1708. It will be understood that the environment 1700 may include more, less, or different components.

As shown in FIG. 17, at [1], the sensors 1704 identify (e.g., generate) sensor data. The sensors 2102 may include a plurality of sensors associated with an environment, a physical asset (e.g., a vehicle), etc. For example, the sensors 1704 may include one or more camera sensors, one or more audio sensors, one or more video sensors, etc. and disposed (e.g., within a physical asset, environment, etc.) to monitor data associated with a physical asset, environment, etc. The sensors 1704 may generate the sensor data over a period of time. Therefore, the sensors 1704 can identify the sensor data.

At [2], the sensors 1704 provide sensor data to the site visibility system 110. For example, the site visibility system 110 can identify sensor data associated with the sensors 1704 (e.g., identify sensor data stored in a data store). In some embodiments, the site visibility system 110 may receive the sensor data via a wired or a wireless connection. For example, the site visibility system 110 may receive sensor data via one or more sensors that are integrated into the site visibility system 110 and/or via a network connection. Further, the site visibility system 110 may receive the sensor data as streaming data or as non-streaming data. Therefore, the site visibility system 110 can identify the sensor data.

At [3], the management server system 1702 obtains a request for data from the user device(s) 1708. For example, the management server system 1702 may cause display of one or more user interfaces via the user device(s) 1708. A user may interact with the one or more user interfaces to generate an input including the request for data. The request for data may include identifying information of the data. For example, the request for data may indicate a physical asset, an environment, a site visibility system, a sensor, a time range, etc. associated with the data.

At [4], the management server system 1702 identifies storage information. The storage information may identify the data store 1706. The storage information may include a link to the data store 1706, a locator and/or identifier for the data store 1706 (e.g., a URL), and/or other identifying information of the data store 1706. In some cases, the management server system 1702 may identify the storage information based on the request for data. For example, the management server system 1702 may identify the storage information based on determining the physical asset, the environment, the site visibility system, the sensor, etc. were previously assigned the storage information. Further, the management server system 1702 may identify the storage information based on a table of assignments, a hash table, a proximity of the data store 1706 to one or more of the physical asset, the environment, the site visibility system, the sensor, etc.

At [5], the management server system 1702 provides the storage information to the site visibility system 110. The management server system 1702 may provide the storage information and an indication of data to be stored at the data store 1706 indicated by the storage information. In some cases, the management server system 1702 may provide instructions to the site visibility system 110 that cause the site visibility system 110 to store the data at the data store 1706.

At [6], the site visibility system 110 upload the sensor data to the data store 1706. For example, the site visibility system 110 can upload the sensor data to the data store 1706 based on the storage information. Further, the site visibility system 110 can upload the sensor data as batch data or as streaming data. In some embodiments, the site visibility system 110 can upload the sensor data to the data store 1706 in real time as the sensors 1704 generate the sensor data. The site visibility system 110 can attempt to upload particular sensor data and, if the attempt fails, reattempt to upload the particular sensor data. For example, the site visibility system 110 can reattempt to upload the particular sensor data via n attempts, where n can be any number. If the site visibility system 110 determines that the site visibility system 110 is unable to upload the particular sensor data (e.g., after n attempts), the site visibility system 110 can notify a component associated with the data store 1706 (e.g., a data store manager) that the site visibility system 110 was unable to upload the particular sensor data. In some cases, the component associated with the data store 1706 (e.g., a data store manager) can request the site visibility system 110 upload particular sensor data. Therefore, the site visibility system 110 can upload the sensor data to the data store 1706.

At [7], the management server system 1702 can monitor the sensor data upload. The management server system 1702 can monitor the sensor data upload based on communications with the data store 1706 and/or by monitoring data stored in the data store 1706. The management server system 1702 can communicate with the site visibility system 110 and/or a component associated with the data store 1706 to determine a status of the sensor data upload. In some cases, the management server system 1702 can monitor the sensor data upload by pinging the site visibility system 110 to determine a status of the upload. Based on monitoring the sensor data upload, the management server system 1702 can generate monitoring information identifying a status of the sensor data upload. For example, the status of the sensor data upload may be complete, cancelled, partially complete, etc. In some cases, the status of the sensor data upload may indicate an amount or percentage of the sensor data uploaded to the data store 1706. In some embodiments, the management server system 1702 can monitor the sensor data upload to determine and/or verify that one or more of the site visibility system 110, the data store 1706, and/or a corresponding sensor are available (e.g., connected to a network, powered on, etc.).

At [8], the management server system 1702 provides the monitoring information to the user device(s) 1708. To provide the monitoring information, the management server system 1702 can generate a user interface that includes the monitoring information. The user interface can include a visualization of the sensor data and/or a visualization of the status of the sensor data upload. Further, the management server system 1702 can cause display of the user interface at the user devices 120.

At [9], the user device(s) 1708 can obtain the sensor data from the data store 1706. Prior to obtaining the sensor data, the user device(s) 1708 can determine the data is uploaded to the data store 1706 based on the provided monitoring information. Based on determining that the data is uploaded to the data store 1706, the user device(s) 1708 can download the sensor data from the data store 1706. In some cases, the user device(s) can simultaneously (e.g., in parallel) stream the data from the site visibility system 110 while the data is uploaded to the data store 1706 from the site visibility system 110 and/or downloaded from the data store 1706 to the user device(s) 1708.

Example Method of Accessing Sensor Data

Figure 18:
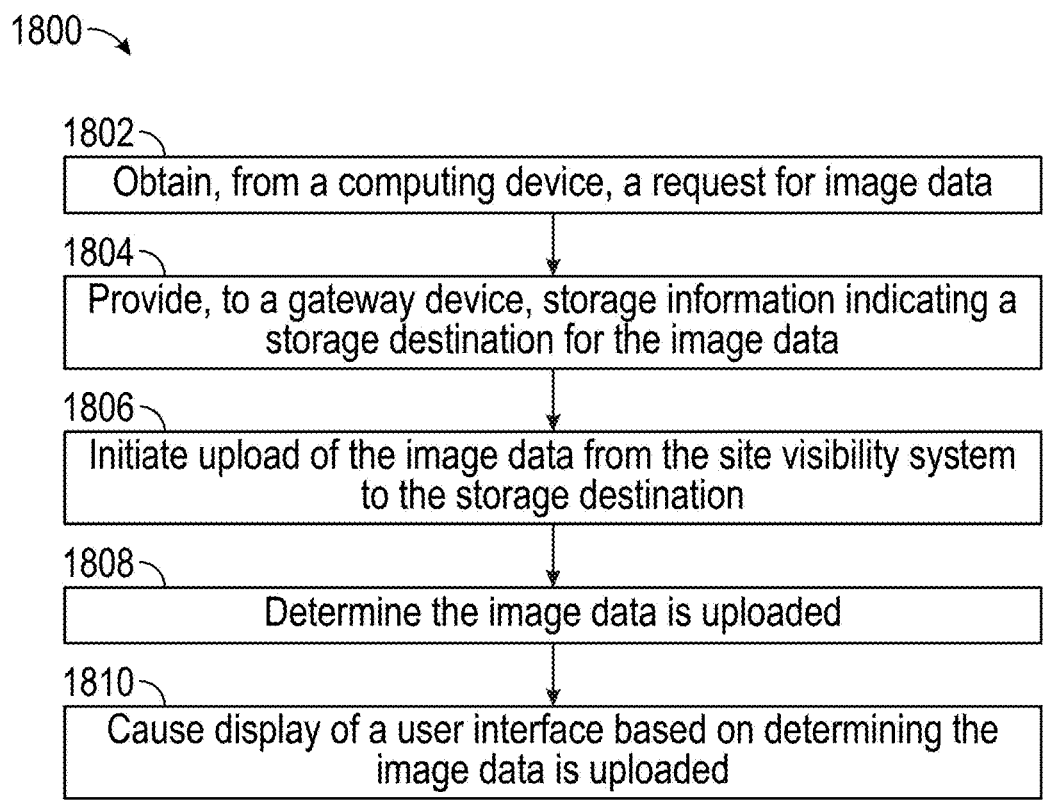
FIG. 18 illustrates an example method of downloading data from a gateway device, according to various embodiments of the present disclosure.

FIG. 18 illustrates an example method 1800 of enabling user computing devices to access sensor data managed by a site visibility system, according to various embodiments described herein.

At block 1802, the management server system obtains, from a computing device, a request for image data (e.g., a request to download image data from a site visibility system). The image data may include streaming image data. Further, the image data may include raw image sensor data. The management server system may, prior to obtaining the request for image data, cause display of a user interface of the computing device (e.g., a first user interface). The user interface may include a plurality of visualizations. All or a portion of the plurality of visualizations may be associated with particular image data from a particular site visibility system. In some cases, the site visibility system may be a gateway device (e.g., a vehicle gateway device). The management server system may obtain input from the user computing device via the user interface. The input may include the request for image data (e.g., a request for image data associated with a particular vehicle).

At block 1804, the management server system provides, to a site visibility system, storage information indicating a storage destination for the image data. The site visibility system may obtain a plurality of image data (or other data) from a plurality of sensors. For example, the site visibility system may obtain a plurality of image data from a plurality of cameras disposed within a monitored environment and store the image data at the site visibility system. The storage information may indicate a data store, a database, a cache, virtual storage, etc. for storage of the image data. For example, the storage information may include a link, a URL, etc. for a data store.

Based on the request for image data, the management server system may identify a particular subset of the data to be uploaded from the site visibility system to the storage destination. For example, the request for image data may indicate one or more filters. The one or more filters may indicate a sensor, a site visibility system, an environment, an activity (e.g., a user walking, a vehicle being driven, etc.), a time period, a physical asset (e.g., a particular vehicle), etc. to be monitored. The management server system can identify the subset of the data to be uploaded using the one or more filters.

In some cases, the management server system may determine a status of the site visibility system. For example, the management server system may prompt or route communications to the site visibility system to determine the status. The status may include may include an active (e.g., available, online, etc.) status and/or an inactive (e.g., unavailable, offline, etc.) status. The management server system may provide the storage information to the site visibility system based on the status. For example, the management server system may delay provision of the storage information based on the status indicating an inactive status until the status indicates that the site visibility system is active. Further, the management server system may cause display of the status at the computing device.

At block 1806, the management server system initiates upload of the image data from the site visibility system to the storage destination. The management server system may initiate upload of the image data by causing the site visibility system to store the image data at the storage destination based on the storage information At block 1808, the management server system determines the image data is uploaded (e.g., to the storage destination). For example, the management server system may communicate with one or more of the storage destination or the site visibility system to determine the image data is uploaded. In some cases, the management server system may monitor the upload of the image data to the storage destination. Further, the management server system can provide monitoring information to the computing device indicating a status of the upload (e.g., complete, partially complete, incomplete, canceled, one or more of the devices (e.g., the site visibility system, the sensor, the storage destination, etc.) are unavailable, paused, etc.). The management server system can provide the monitoring information and cause display of a dynamic visualization including the monitoring information (e.g., a dynamic visualization indicating a status of the upload or storage of the image data).

At block 1810, the management server system causes display of a user interface of the computing device (e.g., a second user interface) based on determining the image data is uploaded. For example, the user interface may include a notification indicating that the image data is uploaded to the storage destination. The user interface may include a visualization of the image data uploaded to the storage destination (e.g., a clip, an image, etc.). Further, the computing device may interact with the user interface and download the image data from the storage destination. Before, during, and/or after the image data is uploaded to the storage destination, the computing device may stream the image data directly from the site visibility system.

In some embodiments, the management server system may obtain a second request for the image data from the computing device (or a separate computing device). The management server system may determine that the image data is stored at the storage destination. Based on determining that the image data is stored at the storage destination, the management server system may cause display of the user interface (e.g., the second user interface) without the site visibility system reuploading the image data to the storage destination.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others. While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A management server system comprising:
a computer readable storage medium having program instructions embodied therewith; and
one or more processors configured to execute the program instructions to:
cause display of a first user interface, wherein the first user interface comprises a plurality of visualizations, each of the plurality of visualizations associated with particular image data from a particular vehicle gateway device;
obtain, from a computing device, input, via the first user interface, the input comprising a first request for image data associated with a vehicle;
assign a storage destination to a vehicle gateway device for upload of the image data by the vehicle gateway device;
provide, to the vehicle gateway device, storage information indicating the storage destination for upload of the image data by the vehicle gateway device in response to assigning the storage destination to the vehicle gateway device and determining the image data is not uploaded to the storage destination, wherein the vehicle gateway device obtains the image data from one or more image sensors;
initiate upload of the image data from the vehicle gateway device to the storage destination in response to providing the storage information to the vehicle gateway device, wherein the vehicle gateway device initiates storage of the image data at the storage destination based on receiving the storage information from the management server system;
determine the image data is uploaded to the storage destination;
cause display of a second user interface based on determining the image data is uploaded to the storage destination, wherein the second user interface comprises a visualization of the image data, wherein the image data is downloaded to the computing device based on one or more interactions associated with the second user interface;
obtain, from the computing device, a second request for the image data;
determine the image data is stored at the storage destination; and
cause display of the second user interface without the vehicle gateway device reuploading the image data to the storage destination based on determining the image data is stored at the storage destination.

2. A management server system comprising:
a computer readable storage medium having program instructions embodied therewith; and one or more processors configured to execute the program instructions to:
obtain, from a computing device, a request for image data;
assign a storage destination to a site visibility system for upload of the image data by the site visibility system;
provide, to the site visibility system, storage information indicating the storage destination for upload of the image data by the site visibility system in response to assigning the storage destination to the site visibility system and determining the image data is not uploaded to the storage destination, wherein the site visibility system obtains the image data from one or more image sensors;
initiate upload of the image data from the site visibility system to the storage destination in response to providing the storage information to the site visibility system, wherein the site visibility system initiates storage of the image data at the storage destination based on receiving the storage information from the management server system;
determine the image data is uploaded to the storage destination; and
cause display of a user interface based on determining the image data is uploaded to the storage destination, wherein the user interface comprises a visualization of the image data, wherein the image data is downloaded to the computing device based on one or more interactions associated with the user interface.

3. The management server system of claim 2, wherein the request for image data indicates one or more filters, the one or more filters comprising at least one of:
a particular sensor;
a particular site visibility system;
a particular environment;
a particular activity;
a particular time period; or
a particular physical asset, wherein the one or more processors are further configured to identify the image data based on the one or more filters.

4. The management server system of claim 2, wherein the one or more processors are further configured to execute the program instructions to:
cause display of a second user interface, wherein the second user interface comprises a plurality of visualizations, each of the plurality of visualizations associated with particular image data from a particular site visibility system, wherein to obtain the request for image data, the one or more processors are further configured to execute the program instructions to receive input, via the second user interface, indicating the image data.

5. The management server system of claim 2, wherein the one or more processors are further configured to execute the program instructions to:
obtain, from the computing device, a second request for the image data;
determine the image data is uploaded to the storage destination; and
cause display of the user interface without the site visibility system reuploading the image data to the storage destination based on determining the image data is downloaded to the storage destination.

6. The management server system of claim 2, wherein the one or more processors are further configured to execute the program instructions to:

determine a status of the site visibility system, wherein the status comprises an active status or an inactive status, wherein providing the storage information is based on determining the status comprises the active status; and
cause display via one or more user interfaces of the computing device.

7. The management server system of claim 2, wherein the one or more processors are further configured to execute the program instructions to:
determine a status of the site visibility system, wherein the status comprises an active status or an inactive status; and
delaying provision of the storage information based on determining the status comprises the inactive status.

8. The management server system of claim 2, wherein the image data comprises streaming image data.

9. The management server system of claim 2, wherein the one or more processors are further configured to:
stream the image data to the computing device.

10. The management server system of claim 2, wherein the site visibility system streams the image data to the computing device.

11. The management server system of claim 2, wherein the site visibility system streams the image data to the computing device during storage of the image data by the site visibility system.

12. The management server system of claim 2, wherein the user interface comprises a user interface of the computing device.

13. The management server system of claim 2, wherein the image data is stored at the site visibility system.

14. The management server system of claim 2, wherein the storage information indicates a data store.

15. The management server system of claim 2, wherein the storage information indicates a uniform resource locator.

16. The management server system of claim 2, wherein the image data comprises raw image sensor data.

17. The management server system of claim 2, wherein the one or more processors are further configured to execute the program instructions to cause display of a notification via the user interface based on determining the image data is uploaded to the storage destination.

18. The management server system of claim 2, wherein the one or more processors are further configured to execute the program instructions to:
monitor upload of the image data from the site visibility system to the storage destination; and
cause display of a dynamic visualization via the user interface based on monitoring the upload of the image data from the site visibility system to the storage destination, wherein the dynamic visualization indicates a status of the upload of the image data from the site visibility system to the storage destination, wherein the status comprises one or more of an incomplete status, a complete status, a partially complete status, a canceled status, or a paused status.

19. The management server system of claim 2, wherein the request for image data comprises a request to download the image data from the site visibility system.

20. A computer-implemented method comprising:
obtaining, from a computing device, a request for image data;
assigning a storage destination to a gateway device for upload of the image data by the gateway device;
providing, to the gateway device, storage information indicating the storage destination for upload of the image data by the gateway device in response to assigning the storage destination to the gateway device and determining the image data is not uploaded to the storage destination, wherein the gateway device obtains the image data from one or more image sensors;

initiating upload of the image data from the gateway device in response to providing the storage information to the gateway device;

determining the image data is uploaded to the storage destination; and causing display of a user interface based on determining the image data is uploaded to the storage destination, wherein the user interface comprises a visualization of the image data.

\* \* \* \* \*